(12) United States Patent
Tremblay et al.

(10) Patent No.: US 12,050,206 B2
(45) Date of Patent: Jul. 30, 2024

(54) PNEUMATIC GRIP SYSTEMS AND MATERIAL TESTING SYSTEMS INCLUDING PNEUMATIC GRIP SYSTEMS

(71) Applicant: Illinois Tool Works Inc., Glenview, IL (US)

(72) Inventors: Keith Tremblay, North Attleboro, MA (US); Richard Conti, North Attleboro, MA (US)

(73) Assignee: Illinois Tool Works Inc., Glenview, IL (US)

( * ) Notice: Subject to any disclaimer, the term of this patent is extended or adjusted under 35 U.S.C. 154(b) by 450 days.

(21) Appl. No.: 17/170,170

(22) Filed: Feb. 8, 2021

(65) Prior Publication Data

US 2021/0247281 A1    Aug. 12, 2021

Related U.S. Application Data

(60) Provisional application No. 62/972,054, filed on Feb. 9, 2020.

(51) Int. Cl.
*G01N 3/10* (2006.01)

(52) U.S. Cl.
CPC ..................... *G01N 3/10* (2013.01)

(58) Field of Classification Search
CPC .... G01N 3/10; G01N 3/04; G01N 2203/0016; G01N 2203/0017; G01N 2203/0042; G01N 2203/0044
See application file for complete search history.

(56) References Cited

U.S. PATENT DOCUMENTS

| | | | |
|---|---|---|---|
| 7,464,698 B2 * | 12/2008 | Maegawa | F02D 41/0045 123/519 |
| 2016/0231210 A1 | 8/2016 | Ganser | |
| 2018/0340554 A1 | 11/2018 | Hutchison | |
| 2019/0113427 A1 | 4/2019 | Barrett, Jr. | |

OTHER PUBLICATIONS

Int'l Search Report and Written Opinion Appln No. PCT/US2021/017241 mailed May 20, 2021.

* cited by examiner

*Primary Examiner* — Erika J. Villaluna
(74) *Attorney, Agent, or Firm* — McAndrews, Held & Malloy, Ltd.

(57) ABSTRACT

An example material testing system includes: a pneumatic grip configured to grip a specimen under test based on a supplied pressure; and a processor configured to control the pressure supplied to the pneumatic grip by repeatedly: controlling a fill valve to increase the supplied pressure; allowing the supplied pressure to stabilize after each increase; and adjusting a pressurization time based on comparing an expected pressure increase to an actual pressure increase during the pressurization.

21 Claims, 21 Drawing Sheets

PNEUMATIC GRIP SYSTEMS AND MATERIAL TESTING SYSTEMS INCLUDING PNEUMATIC GRIP SYSTEMS

RELATED APPLICATIONS

The present application claims the benefit of U.S. Provisional Patent Application Ser. No. 62/972,054, filed Feb. 9, 2020, entitled "PNEUMATIC GRIP SYSTEMS AND MATERIAL TESTING SYSTEMS INCLUDING PNEUMATIC GRIP SYSTEMS." The entirety of U.S. Provisional Patent Application Ser. No. 62/972,054 is expressly incorporated herein by reference.

BACKGROUND

This disclosure relates generally to materials testing, and more particularly, to pneumatic grip systems and material testing systems including pneumatic grip systems.

Universal testing machines are used to perform mechanical testing, such as compression strength testing or tension strength testing, on materials or components.

SUMMARY

Pneumatic grip systems and material testing systems including pneumatic grip systems are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
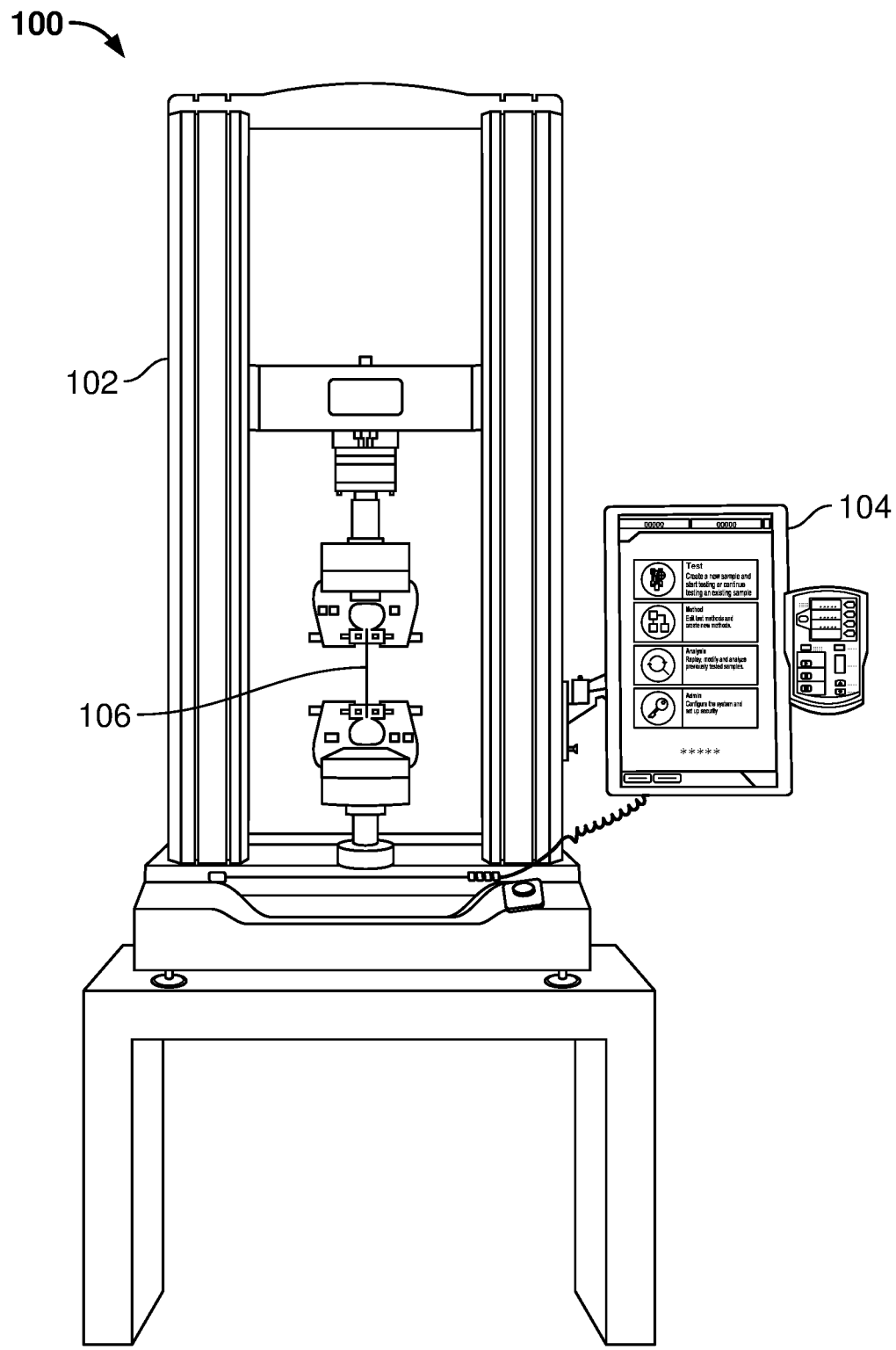
FIG. 1 is an example testing device to perform mechanical property testing, in accordance with aspects of this disclosure.

Conventional material testing systems use mitigation techniques, such as configuration switches, guarding, limited force controls, motion limiting, and/or protection, to improve operator safety. However, conventional material testing systems frequently do not completely comply with international standards. Conventional mitigation techniques require the operator to place the system in the appropriate mode of operation, such as safe interaction or testing. Many conventional safety techniques can be implemented using off-the-shelf safety components, such as programmable logic controllers (PLCs) and/or relays. PLCs and relays typically add significant cost to the material testing system.

Disclosed example material testing systems include a pneumatic grip configured to grip a specimen under test based on a supplied pressure, and a processor configured to control the pressure supplied to the pneumatic grip by repeatedly: controlling a fill valve to increase the supplied pressure; allowing the supplied pressure to stabilize after each increase; and adjusting a pressurization time based on comparing an expected pressure increase to an actual pressure increase during the pressurization.

In some example material test systems, the pneumatic grip includes a first grip and a second grip, and the processor is configured to control the pressure supplied to the pneumatic grip by controlling the pressure to at least one of the first grip or the second grip. Some example material test systems further include a second fill valve, in which the fill valve is configured to control gas flow from a gas supply to the second fill valve, and the second fill valve is configured to control gas flow from the fill valve to the first grip.

In some example material test systems the processor is configured to control the second fill valve to selectively increase pressure, maintain pressure, or relieve pressure via an exhaust. Some example material test systems further include a third fill valve configured to control gas flow from the fill valve to the second grip. In some example material test systems, the processor is configured to allow the supplied pressure to stabilize after each increase by closing the fill valve and the second fill valve.

Some example material test systems further include a dump valve configured to exhaust pressure from the pneumatic grip. In some example material test systems, the fill valve includes a first solenoid and the dump valve includes a second solenoid, and the processor is configured to control the first solenoid and the second solenoid to have default states configured to relieve pressure from the pneumatic grip. In some example material test systems, the processor is configured to determine that the supplied pressure has stabilized based on a rate of change of the pressure. In some example material test systems, the processor is configured to determine that the supplied pressure has stabilized when the rate of change of the pressure is less than a threshold rate.

Example methods to control a pneumatic device on a material testing system are disclosed herein, in which the method includes: controlling, with a processor, a pressure supplied to a pneumatic device of a material testing system by repeatedly, via the processor: controlling a fill valve to increase the supplied pressure; allowing the supplied pressure to stabilize after each increase; and adjusting a pressurization time based on comparing an expected pressure increase to an actual pressure increase during the pressurization.

In some example methods, the pneumatic grip includes a first grip and a second grip, and the controlling of the pressure supplied to the pneumatic grip involves controlling the pressure to at least one of the first grip or the second grip. In some example methods, the controlling of the fill valve to increase the supplied pressure involves: controlling gas flow from a gas supply to a second fill valve; and controlling the second fill valve to control gas flow from the fill valve to the first grip.

Some example methods further involve controlling the second fill valve to selectively increase pressure, maintain pressure, or relieve pressure via an exhaust. In some example methods, the controlling of the fill valve to increase the supplied pressure involves controlling gas flow from the fill valve to the second grip by controlling a third fill valve. In some example methods, the allowing of the supplied pressure to stabilize involves closing the fill valve and the second fill valve.

Some example methods further involve controlling a dump valve to exhaust pressure from the pneumatic grip. In some example methods, the fill valve includes a first solenoid and the dump valve includes a second solenoid, and the method further involves controlling the first solenoid and the second solenoid to have default states configured to relieve pressure from the pneumatic grip. Some example methods further involve determining that the supplied pressure has stabilized based on a rate of change of the pressure. In some example methods, the determining that the supplied pressure has stabilized is in response to determining that the rate of change of the pressure is less than a threshold rate.

Disclosed example material testing systems embed or integrate a safety system complying with international standards within the material testing system. Because the safety system is integrated into the material testing systems, disclosed example material test systems provide safety improvements at a much lower cost than would be accomplished using off-the-shelf parts because the safety system is integrated into the existing electronics, semiconductors, and/or circuit boards of the material testing systems. Integration further improves reliability, which reduces or eliminates external wiring between purchased safety components.

As described in more detail below, disclosed example safety systems for material testing systems include machine state indicators that visually show the state of the testing machine from an operational restriction perspective. Disclosed example safety systems for material testing systems provide high reliability and monitored activation mechanisms at the machine point of control, which may include internal fault checking and/or power supply diagnostics within the material testing systems. In some examples, pneumatic grips are provided with two stage grip pressure control and monitoring. Disclosed example material testing systems are compatible with interlock guarding systems having redundant or diverse contacts. Such guarding systems comply with ISO safety standards by using redundant, diverse, and/or dynamic monitoring in real time. Disclosed example material testing systems include redundant crosshead travel limit monitoring. The material testing system shutdown circuitry of disclosed examples is compliant with international safety standards including ISO 13849-1.

Additionally, conventional off-the-shelf safety relay components used with PLCs use an extra layer of firmware within the PLC to stop the motion of the moving components during an emergency stop event. Disclosed example safety systems for material testing systems are configured to enable the hardware (e.g., an emergency stop button) to directly shutdown a power amplifier drive to the actuator(s), regardless of whether the embedded firmware within the safety processor is running.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling. Firmware may include stored instructions such as Safety Rated Embedded Software (SRESW) and/or Safety Rated Application Software (SRASW).

Disclosed example material testing systems are compliant with the European Machinery Directive, following the rules set forth in the ISO 13849-1 standard, which pertains to the "Safety Related Parts of Control Systems." The following functions, which are determined by a system risk analysis, are integrated into the material testing system. The safety system provides a disabled drive state to remove energy from the drive crosshead, a disabled drive state to remove energy from the gripping system, and a restricted drive state for operator setup. In the restricted drive state, the example safety systems monitor the crosshead speed to maintain the crosshead speed below an upper speed limit, monitor for intentional manual movement (jogging) of the crosshead, monitor for reduced gripping pressure when closing, and/or monitor for intentional grip closure As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system.

The disclosed example material testing systems further include an unrestricted drive state, which enables the removal of checks in the restricted drive state. In some examples, the unrestricted drive state can be entered via a dual activation mechanism, in which material testing functionality is performed and the operator does not interact with the system.

Disclosed example material testing systems include indicators for different states, such as a disabled state, a setup state (e.g., restricted drive mode), a caution state (e.g., unrestricted drive mode), and a testing state (e.g., unrestricted drive mode) indication on every machine to clearly indicate when the operator may interact and when a hazard is present.

Disclosed example material testing systems include one or more stop functions that are configured to take precedence over the starting and/or continuation of motion of components such as the crosshead or grips. Furthermore, one or more stop functions may be redundantly configured via hardware such that the stop functions are effective to disable the material testing system even when software portions of the safety system are disabled. Examples of such stop functions that may be included in disclosed systems include interlocked guards and/or emergency stop switches.

Some disclosed example material testing systems include selection and enforcement of a single control point for starting the material testing frame and/or gripping system. Some example systems provide power failure monitoring and/or protection to ensure the system stops unrestricted operation and places the material test system into the disabled drive state upon re-establishment of power. In some examples, in response to a power failure, any pneumatic specimen gripping is automatically de-energized.

Disclosed example safety systems and material testing systems include increased internal diagnostics and reporting to the operator of critical errors within the system, such as malfunctions of equipment or conflicts between redundant inputs, outputs, and/or processes. Disclosed example material testing systems enable faster specimen removal and/or insertion, relative to conventional material testing systems, due to the safe setup mode of the testing machine that permits operator activity within the test space without disabling of the material testing system or requiring guard doors. Disclosed example systems further improve operator safety when setting up and configuring the system inside the test space, due at least in part to use of the setup state, which restricts motion of the crosshead and/or limited motion and/or force that can be exerted by the grips.

Disclosed material testing systems and safety systems may be specially configured to be utilized in the disclosed example configurations, to achieve identified risk mitigations. Disclosed material testing systems are significantly more efficient and targeted to materials testing than purchasing general purpose, off-the-shelf, discrete safety components.

Disclosed material testing systems and safety systems are configured to return to a restricted state whenever the unrestricted states are not in active use and/or to require intentional action by operators to transition from restricted states to the unrestricted states. Example material testing systems and safety systems provide active warning notifications at the time the unrestricted states are activated. Example active warning notifications include defined as notifications that appear and/or disappear at locations the operator is likely to be observing (e.g., as opposed to providing static labels or other static visuals on the material testing system). Furthermore, disclosed example notifications are intuitive, such as by providing commonly understood color schemes (e.g., green, yellow, red) to signify the state of the material testing system.

FIG. 1 is an example material testing system 100 to perform mechanical property testing. The example material testing system 100 may be, for example, a universal testing system capable of static mechanical testing. The material testing system 100 may perform, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally or alternatively, the material testing system 100 may perform dynamic testing.

The example material testing system 100 includes a test fixture 102 and a computing device 104 communicatively coupled to the test fixture 102. The test fixture 102 applies loads to a material under test 106 and measures the mechanical properties of the test, such as displacement of the material under test 106 and/or force applied to the material under test 106. While the example test fixture 102 is illustrated as a dual column fixture, other fixtures may be used, such as single-column test fixtures.

The example computing device 104 may be used to configure the test fixture 102, control the test fixture 102, and/or receive measurement data (e.g., transducer measurements such as force and displacement) and/or test results (e.g., peak force, break displacement, etc.) from the test fixture 102 for processing, display, reporting, and/or any other desired purposes.

Figure 2:
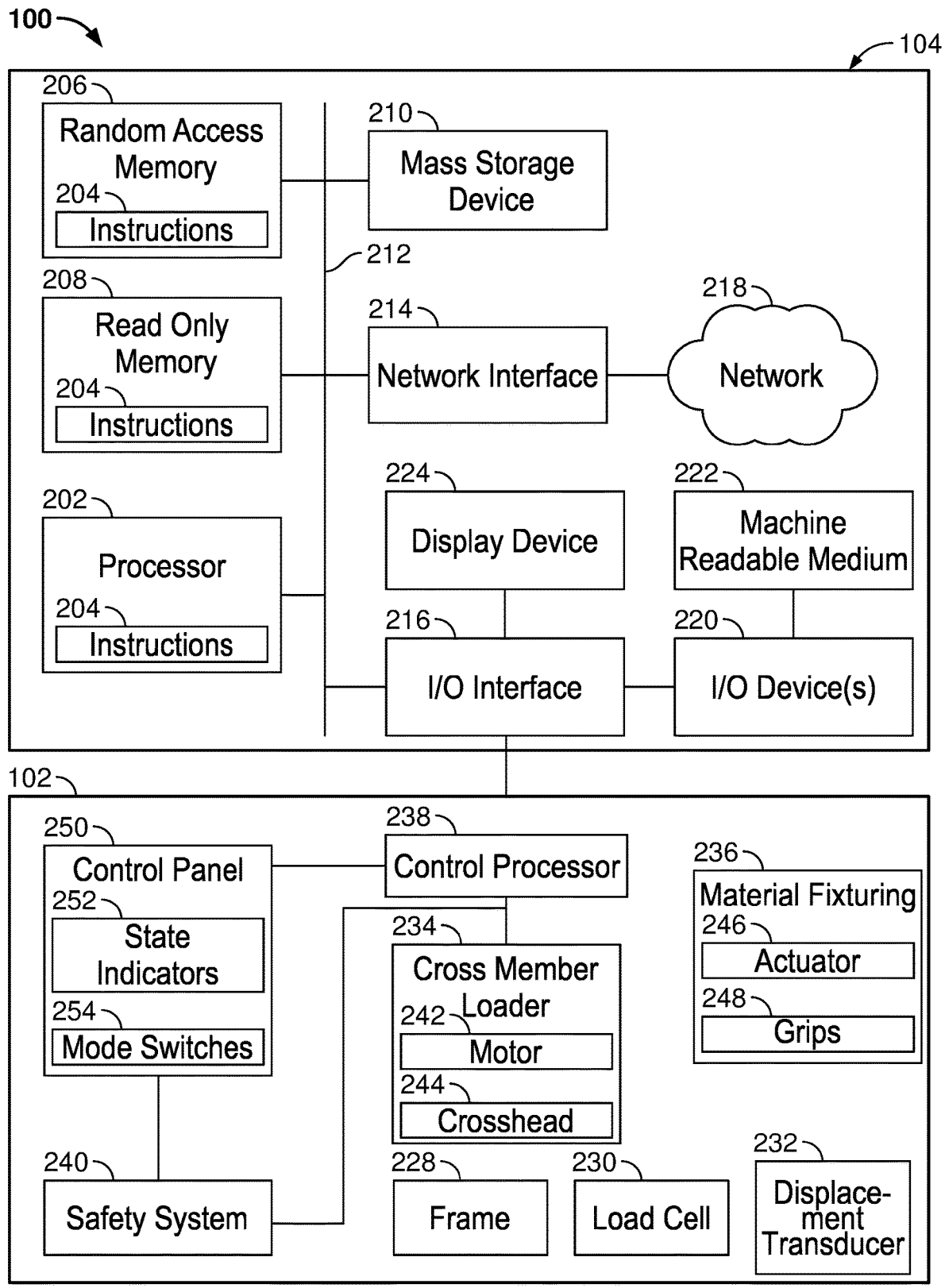
FIG. 2 is a block diagram of an example implementation of the testing device of FIG. 1.

FIG. 2 is a block diagram of an example implementation of the material testing system 100 of FIG. 1. The example material testing system 100 of FIG. 2 includes the test fixture 102 and the computing device 104. The example computing device 104 may be a general-purpose computer, a laptop computer, a tablet computer, a mobile device, a server, an all-in-one computer, and/or any other type of computing device.

The example computing device 104 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing device 104 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example material testing system 100 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing device 104 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The example material testing system 100 of FIG. 1 further includes the test fixture 102 coupled to the computing device 104. In the example of FIG. 2, the test fixture 102 is coupled to the computing device via the I/O interface 216, such as via a USB port, a Thunderbolt port, a FireWire (IEEE 1394) port, and/or any other type serial or parallel data port. In some other examples, the test fixture 102 is coupled to the network interface 214 and/or to the I/O interface 216 via a wired or wireless connection (e.g., Ethernet, Wi-Fi, etc.), either directly or via the network 218.

The test fixture 102 of FIG. 2 includes a frame 228, a load cell 230, a displacement transducer 232, a cross-member loader 234, material fixtures 236, a control processor 238, and a safety system 240. The frame 228 provides rigid structural support for the other components of the test fixture 102 that perform the test. The load cell 230 measures force applied to a material under test by the cross-member loader 234 via the grips 236. The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the material testing system 100 include electric motors, pneumatic actuators, hydraulic actuators, piezoelectric actuators, relays, and/or switches.

Example grips 236 include compression platens, jaws or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The example control processor 238 communicates with the computing device 104 to, for example, receive test parameters from the computing device 104 and/or report measurements and/or other results to the computing device 104. For example, the control processor 238 may include one or more communication or I/O interfaces to enable communication with the computing device 104. The control processor 238 may control the cross-member loader 234 to increase or decrease applied force, control the fixture(s) 236 to grasp or release a material under test, and/or receive measurements from the displacement transducer 232, the load cell 230 and/or other transducers.

The example safety system 240 provides an additional layer of monitoring and control to the test fixture 102. The safety system 240 monitors operator inputs and the state of the test fixture 102. In the example of FIG. 2, the safety system 240 restricts operation of the test fixture 102 by the user so that the test fixture 102 is only controllable by the user when the machine is in an appropriate state. In response to detecting one or more conditions, the safety system 240 will automatically cause the test fixture 102 to go to a restricted state (e.g., a restricted setup state, disable all power and motion that could present a hazardous condition, etc.).

As discussed in more detail below, the safety system 240 selectively adds, removes, increases, and/or decreases restrictions on operation of the material testing system based on monitoring input signals from the material testing system 100, input signals from the safety system 240, and/or control signals from the control processor 238. The safety system 240 controls operation of the material testing system 100 by determining a state, from multiple predetermined states, in which the material testing system 100 is to be operated at any given time. Example predetermined states include one or more restricted states, in which one or more operations of the material testing system 100 are restricted (e.g., disabled, limited, etc.) and one or more unrestricted states, in which the restrictions of the restricted states are reduced and/or removed. In the example of FIG. 2, the safety processor 240 attaches to and/or interrupts the control of the cross-member loader 234 and/or the fixture(s) 236 by the control processor 238. In some other examples, the safety system 240 may directly control the cross-member loader 234 and/or the fixture(s) 236 while enforcing any applicable restrictions on the actuators.

Example restricted states include a setup state and a disabled state. In the setup state, the safety system 240 restricts one or more actuators (e.g., the motor 242 and/or the grip actuator(s) 246), and controls (or permits control of) the actuators in response to operator inputs. Example restrictions on the motor 242 and/or the crosshead 244 may include an upper speed limit, and/or an upper or lower position limit of the crosshead 244 relative to the test fixture 102. Example restrictions on the grip actuator(s) 246 may include an upper pressure limit and/or an upper grip force limit. In the disabled state, the safety system 240 restricts the actuators and the control processor 238 does not control the actuator in response to operator inputs (e.g., does not attempt to control the motor 242 and/or the grip actuator(s) 246, or is prevented from controlling the motor 242 and/or the grip actuator(s) 246 via de-energization).

Example unrestricted states include a caution state and a testing state. In the example caution state, the safety system 240 reduces restrictions on the actuator (e.g., motor 242 and/or the grip actuator(s) 246), and does not control the actuator(s) motor 242 and/or the grip actuator(s) 246. In the caution state, the control processor 238 may control the actuator(s) to perform actions such as high speed jogging of the crosshead 244 and/or increasing grip force by the pneumatic grips 248, for which the operator should not be physically proximate the crosshead 244 and/or the pneumatic grips 248. In the example testing state, the safety system 240 reduces restrictions on the actuator, while the control processor 238 controls the actuator(s) to perform testing (e.g., in accordance with a material testing procedure or program executed by the control processor 238).

The example material testing system 100 of FIG. 2 may further include one or more control panels 250, including multiple state indicators 252 and one or more mode switches 254. The mode switches 254 may include buttons, switches, and/or other input devices located on an operator control panel. For example, the mode switches 254 may include buttons that control the motor 242 to jog (e.g., position) the crosshead 244 at a particular position on the frame 228, switches (e.g., foot switches) that control the grip actuators 246 to close or open the pneumatic grips 248, a mode control button that is depressed in conjunction with another button to enable the safety system 240 to permit operation in an unrestricted state, and/or any other input devices that could result in operation in an unrestricted state.

The state indicators 252 correspond to a set of predetermined states (e.g., the disabled, setup, caution, and testing states described above) to which the safety system 240 can set the material testing system 100. As described in more detail below, the safety system 240 controls the state indicators 252 to provide an indication as to the present state of the material testing system 100 as determined by the safety system 240. The state indicators 252 may include lights, displays, audio, mechanical systems, and/or any other indication that can be identified by the operator.

Figure 3:
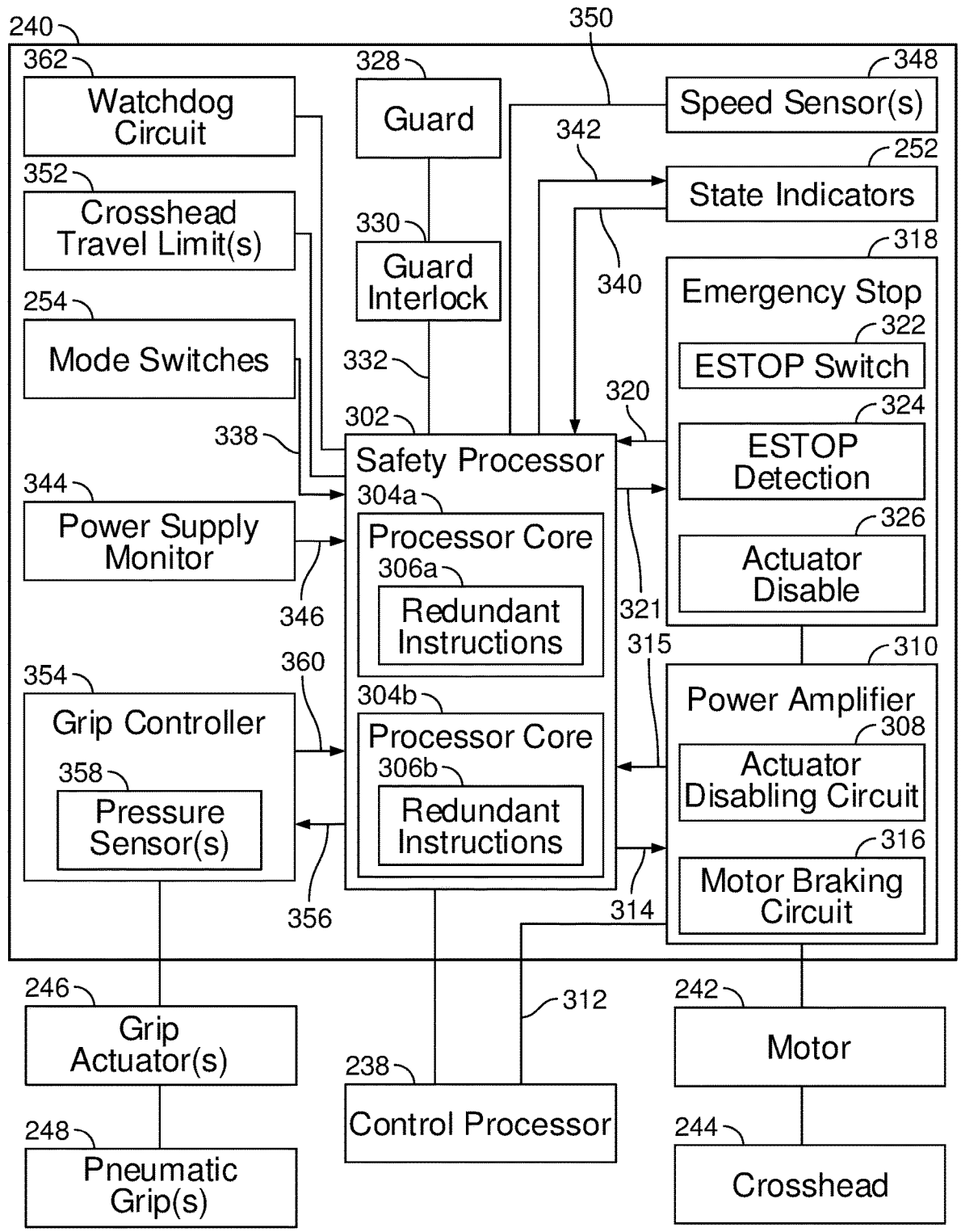
FIG. 3 is a block diagram of an example implementation of the safety system of FIG. 2.

FIG. 3 is a block diagram of an example implementation of the safety system 240 of FIG. 2. As illustrated in FIG. 3, the safety system 240 includes a safety processor 302.

The example safety processor 302 includes multiple, redundant processing cores 304a, 304b. The processing cores 304a, 304b execute redundant instructions 306a, 306b and receive redundant inputs, such that the processing cores 304a, 304b should, during normal operation of the test fixture 102, produce substantially identical outputs. The safety processor 302 (e.g., via the redundant cores 304a, 304b) monitors the plurality of inputs and determines the state of the material testing system 100 based on the inputs. The safety processor 302 may compare outputs of the redundant instructions 306a 306b and control the state of the material testing system 100 based on the comparison of the outputs.

The example safety processor 302 and/or the redundant processing cores 304a, 304b may be include general purpose central processing unit (CPU) from any manufacturer. In some other examples, the safety processor 302 and/or the redundant processing cores 304a, 304b may include one or more specialized processing units, such as RISC processors with an ARM core, graphic processing units, digital signal processors, and/or system-on-chips (SoC). The safety processor 302 and/or the redundant processing cores 304a, 304b execute machine readable instructions, such as the redundant instructions 306a, 306b that may be stored locally at the processor (e.g., in an included cache or SoC), in a storage device such as a random access memory, a read only memory, and/or a mass storage device.

The redundant processing cores 304a, 304b and the redundant instructions 306a, 306b allow redundant and/or diverse inputs and outputs to be processed by the safety system 240, which provides a highly reliable and predictable system. Thus, while representative inputs and outputs are illustrated in FIG. 3, these inputs and/or outputs may be duplicated to support the redundant processing cores 304a, 304b and the redundant instructions 306a, 306b. The redundant instructions 306a, 306b (e.g., embedded software, operating system, and generated code) execute by the safety processor 302 is compliant with the processes outlined in international standards, including but not limited to ISO 13849-1, which pertains to "Safety Related Parts of Control Systems." While the example safety processor 302 includes multiple, redundant processing cores, in other examples the safety processor 302 may include a single processing core, or multiple, non-redundant processing cores.

The safety system 240 of FIG. 3 further includes an actuator disabling circuit 308 that selectively disables a power amplifier 310 from providing energy to the motor 242 of the crosshead 244. Additionally or alternatively, the actuator disabling circuit 308 (or another actuator disabling circuit) may disable the grip actuator(s) 246 from providing energy to the pneumatic grip(s) 248. The power amplifier 310 receives input power and outputs power to the motor 242 to control movement of the crosshead 244. The example actuator disabling circuit 308 and the power amplifier 310 may be implemented using a safety rated Safe Torque Off (STO) high-reliability servo power amplifier. The control processor 238 may control the motor 242 and movement of the crosshead 244 via a motor control signal 312 to the power amplifier 310.

In response to an STO signal 314 from the safety processor 302, the actuator disabling circuit 308 disables the connected actuator (e.g., the motor 242). For example, the actuator disabling circuit 308 may disconnect all energy to the motor 242 (and/or other moving parts in the material testing system 100), in less than a certain defined period of time. The example actuator disabling circuit 308 may provide an STO feedback signal 315 to the safety processor 302, which indicates whether the actuator disabling circuit 308 is currently disabling the actuator. The safety processor 302 may compare the STO signal 314 to the STO feedback signal 315 to detect faults.

In the example material testing system 100, the travel of the moving crosshead 244 and any internal components is stopped after activation of the STO signal 314 as specified by international standards. Most of the subsystems of the safety system 240 disclosed herein activate the actuator disabling circuit 308 to safely stop the machine. Additionally, the power amplifier 310 may include a motor braking circuit 316 to decelerate the motor 242 before applying the STO signal 314. The motor braking circuit 316 allows the motor 242 to stop in a more controlled manner by eliminating continued movement by mechanical inertia after shutting down drive power. Using pre-disabling braking reduces or minimizes the motion of the crosshead 244 after the motor 242 is de-energized. Thus, the example actuator disabling circuit 308 and the motor braking circuit 316 provide a Category 1 stop as defined in the IEC 60204-1 standard, which is the "Electrical Safety Standard for Machinery."

The example safety processor 302 monitors the motor 242 and/or the motor braking circuit 316 while pre-disabling braking is occurring to confirm that the motor 242 is braking. If the safety processor 302 determines that the motor 242 is not slowing down during the braking, then the safety processor 302 performs a braking failure mitigation to cease the braking and immediately de-energize the motor 242. By implementing braking failure mitigation to the two-stage disabling sequence, the safety processor 302 may shorten stopping distance in situations in which the braking is ineffective. While the shortest stopping distance occurs when the pre-disabling braking is operative, when the pre-disabling braking is not completely operative, then a two-stage sequence involving an inoperative pre-disabling braking can have a longer stopping distance than a single-stage sequence (e.g., only disconnection). A secondary advantage of braking failure mitigation is that the mitigation enables more flexibility in implementing the two-stage disabling sequence, in that a wider range of components and systems can be used for high-performance braking with a braking failure mitigation process that can catch failures with the braking system.

The example safety system 240 further includes an emergency stop 318 (e.g., a button, a switch, etc.) that provides an emergency stop input signal 320 to the safety processor 302. The emergency stop 318 may be a manually operated emergency stop button, which is a complementary-type safety function. The emergency stop 318 includes two channel redundancy for signaling. The emergency stop 318 may include an emergency stop switch 322, emergency stop detection circuits 324, and an actuator disabling circuit 326. The emergency stop 318 is independently controllable using the hardware and embedded software of the safety processor 302. For example, in response to detecting the emergency stop input signal 320 from the emergency stop detector 324, the safety processor 302 sets the state of the material testing system 100 to the disable state and provides an emergency stop output signal 321 to the emergency stop 318 (e.g., to the emergency stop switch 322).

The emergency stop switch 322, in response to the emergency stop output signal 321, controls the actuator disabling circuit 326 to control the actuator disabling circuit 314 and/or the motor braking circuit 314 to stop the motor 242. The example actuator disabling circuit 326 may have a first connection to the motor braking circuit 314, and second redundant connections to the actuator disabling circuit 308. When the actuator disabling circuit 326 is triggered, the actuator disabling circuit 326 activates the motor braking circuit 314, delays for a time to permit the braking to occur, and then activates the actuator disabling circuit 308 to de-energize the applicable actuator.

In addition or as an alternative to control via the safety processor 302, the emergency stop switch 322 may directly actuate the actuator disabling circuit 308 within the power amplifier 310, such as by physical interruption of the STO signal 314 between the safety processor 302 and the actuator disabling circuit 308. The safety processor 302 monitors the emergency stop detection circuits 324 and acts as a redundant monitor to the hardware. The safety processor 302 outputs the STO signal 314 to control the actuator disabling circuit 308 to continue to disable the motor 242 so that, when the emergency stop switch 322 is released, the material testing system 100 will remain disabled (e.g., in a restricted state) and require user interaction to re-enable operation of the motor 242.

The example material testing system 100 (e.g., the test fixture 102) is compatible with interlock guarding systems with redundant or diverse contacts. The example safety system 240 may include one or more guards 328 and guard interlocks 330 configured to provide physical and/or virtual barriers to operator access to the material testing system 100 while operating in an unrestricted state. For example, the guards 328 may include physical barriers that are opened and closed to control access to the volume around the pneumatic grips 248 and/or the crosshead 244 (and/or other moving components). Example physical barriers include guard doors, which may use redundant safety switches to monitor whether the doors guarding the protected volume are open or closed. Each door switch has mechanically linked normally open and normally closed contacts, which may be dynamically pulsed (e.g., by the guard interlocks 330) and/or otherwise received as inputs. Pulsing permits plausibility diagnostic checking of the guard door switches in real time.

Additionally or alternatively, the guards 328 may include virtual guards that monitor the volume around the pneumatic grips 248 and/or the crosshead 244 for intrusion into the volume. Example virtual guards may include light curtains, proximity sensors, and/or pressure pads. While virtual guarding does not physically prevent access, the virtual guarding outputs guarding signals to the guard interlocks 330, which output interlock signals 332 to the safety processor 302 and/or actuator disabling circuit 308 (e.g., similar to the emergency stop switch 322 discussed above).

The interlocks 330 may trigger the actuator disabling circuit 308 to de-energize the motor 242. In some examples, the safety processor 302 controls re-enabling of the power amplifier 310 when the guard interlocks 330 are no longer triggered, in a similar manner as the emergency stop switch 322 discussed above.

Additionally or alternatively, the example safety system 240 may default to a restricted "setup" state when an operator enters the protected volume of the material testing system 100. Instead of disabling or de-energizing actuators of the system 100, the setup state enforces restrictions on speed, pressure, or other activities.

The example safety system 240 includes multiple state indicators 252 and mode switches 254. The example safety processor 302 monitors the mode switches 254 by, for example, dynamically pulsing the mode switches 254 to generate or obtain mode switch input signals 338 (e.g., one or more mode switch inputs for each of the mode switches 254). In some examples, the mode switches 254 are high-reliability switches. The safety processor 302 may test the mode switches 254 for short circuits or other faulty conditions periodically, aperiodically, in response to events (e.g., at startup of the material testing machine), on a predetermined schedule, and/or at any other times.

The example safety processor 302 controls the state indicators 252 to indicate the state of the material testing system 100 to the operator. For example, the safety processor 302 may output indicator signals 342 to the state indicators 252. If the state indicators 252 are lights, the output indicator signals 342 may, for example, control each of the lights to be on, off, flashing, and/or any other output for the lights. In some examples, the safety processor 302 determines the conditions of the indicators via indicator feedback signals 340. Example indicator feedback signals 340 may indicate to the safety processor 302 whether each of the state indicators 252 is on, off, short-circuited, open-circuited, and/or any other status or condition of the state indicators 252. If the processor determines that one or more of the state indicators 252 are not in the commanded proper state, the safety processor 302 controls the material testing system to be in a restricted state provides a notification to the operator (e.g., via the control panel 250 or other notification).

The safety system 240 includes a power supply monitor 344 to monitor the power supplies (e.g., DC and AC power supplies) that provide power to components of the material testing system 100. The power supply monitor 344 provides one or more power supply status signals 346 to the safety processor 302 and/or to the watchdog circuit 362 (described below) to indicate whether the monitored power supplies are within respective voltage and/or current ranges. If the power supply monitor 344 determines that one or more of the power supplies are out of tolerance, the safety processor 302 and/or to the watchdog circuit 362 may disable the material testing system 100 and alert the operator.

The example safety system 240 further includes one or more speed sensor(s) 348. The example speed sensor(s) 348 may be integrated, redundant, and/or diverse speed monitoring sensors. The speed sensor(s) 348 provide speed signal(s) 350, which are representative of the crosshead speed, to the safety processor 302. The safety processor 302 monitors the speed signal(s) 350 to ensure the crosshead 244 does not exceed an upper speed limit (e.g., crosshead travel limit(s) 352) as determined by the current operating mode of the machine. For example, the value of the upper speed limit may depend on whether the material testing system 100 is in a restricted state or an unrestricted state. In some examples, two speed sensors that operate on different principles may be used in the material testing system 100 to prevent the sensors 348 from sustaining common cause failures. The speed signal 350 of each speed sensor 348 is read and compared by the safety processor 302 to verify that the speed signals 350 are in agreement. If one speed sensor 348 indicates a different speed than another speed sensor 350, the safety processor 302 disables the material testing system 100 (e.g., via the actuator disabling circuit 308).

The example crosshead travel limit(s) 352 may include a travel limit that specifies a limit on the position of the crosshead 244. When the crosshead travel limit(s) 352 is reached, the safety processor 302 stops the motion of the crosshead 244. In some examples, the crosshead travel limit(s) 352 are multi-level limits, where the number of limits that are triggered indicate how far the crosshead travel limit(s) 352 have been exceeded. In some examples, a first level limit is handled by the safety processor 302 to stop operation of the applicable actuator (or all actuators), such as the motor 242. As the crosshead 244 continues to move beyond the first level limit and hits a second level limit (e.g., farther outside of the acceptable range than the first level limit), the crosshead travel limit 352 may trigger a direct connection (e.g., a hardware connection) to the actuator disabling circuit 308 and/or the motor braking circuitry 316, and/or to the actuator disabling circuit 326, to trigger the two phase disabling of the motor 242.

In some examples in which the material testing system 100 includes automatic gripping (e.g., pneumatically powered grips, hydraulically powered grips, electrically powered grips, electromechanically powered grips, electromagnetically powered grips, etc.), the safety system 240 includes a grip controller 354 that controls the grip actuators according to a multi-pressure gripping scheme. The multi-pressure gripping scheme reduces (e g, minimizes, eliminates) the risk of injury to an operator when installing material test specimens in the material testing system 100 the pneumatic grips 248.

When the safety processor 302 is controlling the material testing system 100 in the setup state, the safety processor 302 provides a pressure signal 356 to the grip controller 354. The grip controller 354 controls the upper limit on the pressure that may be applied via the grips 248 by controlling the grip actuator(s) 246. The pressure signal 356 (which may be directly proportional to specimen gripping force) is limited to allow enough pressure to grip the specimen via the grips 248, but not enough pressure to cause severe injury to the operator. Conversely, when the safety processor 302 is controlling the material testing system 100 in the caution or testing states, the safety processor 202 provides the pressure signal 356 to cause the grip controller 354 to enable the higher pressure used to grip test specimens during testing. The example grip controller 354 may monitor the main system pressure (e.g., via pressure sensor(s) 358) and/or the pressure(s) in the pneumatic grip(s) 248 (e.g., upper and lower grips). The grip controller 354 feeds the pressure signals 360 to the safety processor 302 to verify that the commanded pressures are being enforced.

In some examples, the grip controller 354 is controlled via an operator input using a foot pedal switch. For example, the foot pedal switch may include separate switches to apply pressure and to release pressure via the pneumatic grip(s) 248. The switches may be mechanically linked switches, which may be dynamically pulsed to check for plausibility between the switches and/or to monitor for potential faults in the switches (e.g., electrical faults).

The safety processor 302 further controls the grip controller 354 to de-energize the grip actuator(s) 246 when power is disabled to the material testing system 100. For example, the safety processor 302 may control the grip actuator(s) 246 (e.g., via one or more valves, relays, etc.) to enable pressurization when powered, but to be normally depressurized for pneumatic actuators such that the pneumatic grip(s) 248 are prevented from applying grip force when the material testing system 100 is unpowered.

The example safety system 240 further includes a watchdog circuit 362. The watchdog circuit 362 communicates with the safety processor 302 periodically, aperiodically, in response to one or more events or triggers, and/or at any other time to verify the operation of the safety processor 302. For example, the safety processor 302 may communicate a heartbeat signal, or a response to a challenge from the watchdog circuit 362, to indicate to the watchdog circuit 362 that the safety system 240 is operating properly. If the watchdog circuit 362 does not receive an expected signal from the safety processor 302, the watchdog circuit 362 disables the material testing system 100 and notifies the operator.

The example safety processor 302, the example emergency stop 322, the example guard interlock 330, the example crosshead travel limit(s) 352, and/or the example watchdog circuit 362 are coupled (e.g., connected via hardware) to the actuator disabling circuit 326. When any of the safety processor 302, the emergency stop 322, the guard interlock 330, the crosshead travel limit(s) 352, and/or the watchdog circuit 362 determine that a respective condition is satisfied so as to disable the material testing system 100 (e.g., activation of the emergency stop switch 322, tripping of the guard 328, exceeding a crosshead travel limit 352, and/or triggering of the watchdog circuit 362), the actuator disabling circuit 326 is used to activate the motor braking circuit 316 and the actuator disabling circuit 308. The safety processor 302 may determine that the state of the material testing system 100 is the disabled state.

While the example control processor 238 and the safety processor 302 are illustrated as separate processors, in other examples the control processor 238 and the safety processor 302 may be combined into a single processor or set of processors that are not divided into control and safety functions. Furthermore, the control processor 238, the safety processor 302, and/or combined processors may include non-processing circuitry, such as analog and/or digital circuitry to perform one or more specialized functions.

Figure 4A:
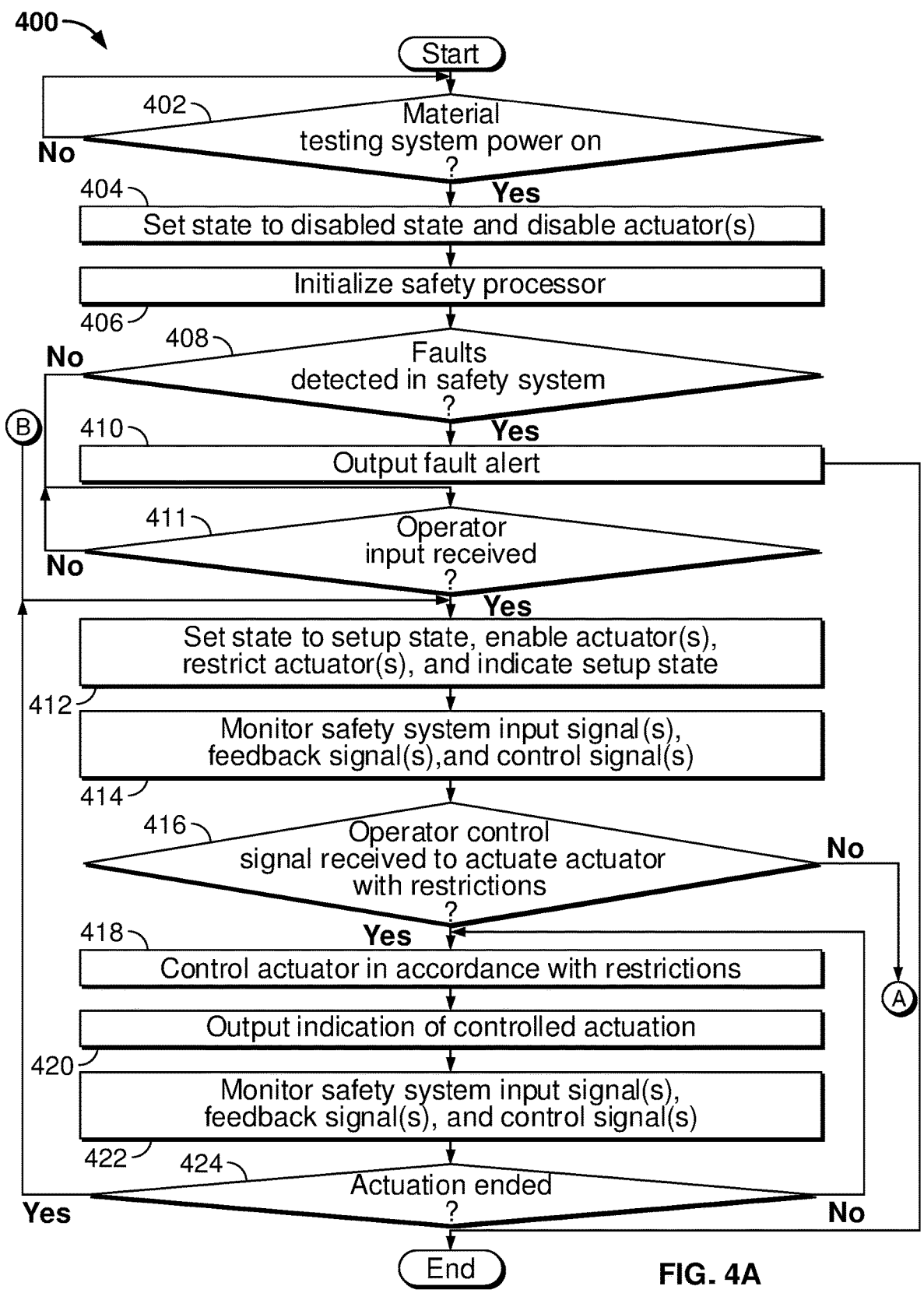
FIGS. 4A and 4B show a flowchart representative of example machine readable instructions which may be executed by the safety processor of FIG. 3 to control states of the material testing system of FIGS. 1-3.
Figure 4B:
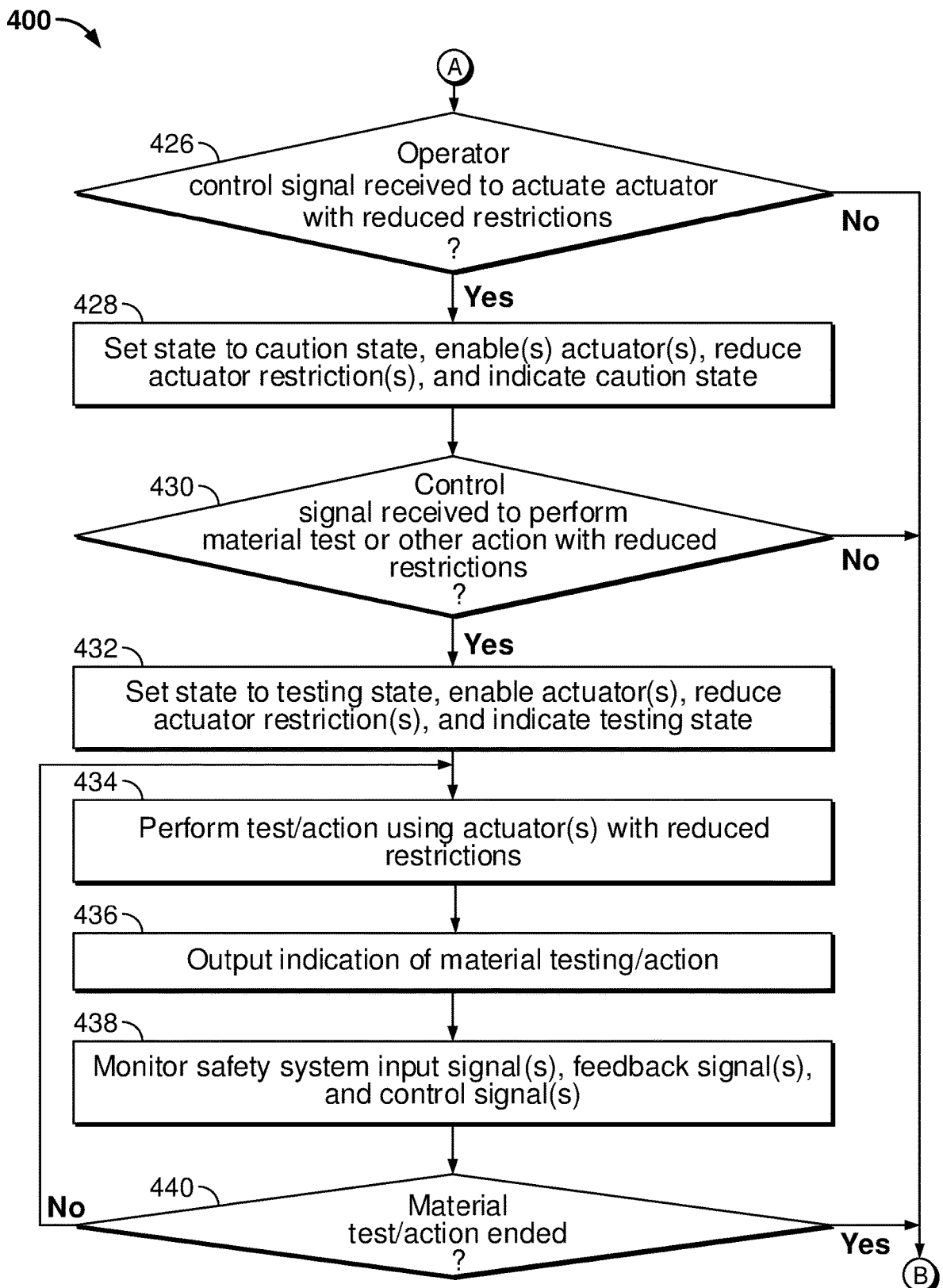

FIGS. 4A and 4B show a flowchart representative of example machine readable instructions 400 which may be executed by the safety processor 302 of FIG. 3 to control states of the material testing system of FIGS. 1-3. The example instructions 400 may be executed to determine a state of the material testing system from a plurality of predetermined states, enforce restrictions on the actuator, and automatically set the state of the material testing system to one of the restricted states in response to completion of an action involving controlling the actuator.

At block 402, the material testing system 100 and/or one or more subsystems may be powered on. If the material testing system 100 is not powered on, block 402 iterates until the material testing system 100 is turned on. When the material testing system 100 is powered on (block 402), at block 404 the safety system 240 sets the state of the material testing system 100 to a disabled state and disables one or more actuator(s) (e.g., the motor 242, the grip actuator(s) 246). For example, the safety system 240 may default the actuator disabling circuit 308 to de-energizing the motor 242.

At block 406, the safety processor 302 is initialized. For example, the safety processor 302 may perform fault checks (e.g., checking inputs, outputs, and/or attached devices for open circuits and/or closed circuits), redundancy checks (e.g., determining that redundant inputs and/or redundant outputs are in agreement), and/or other initialization processes.

At block 408, the safety processor 302 determines whether any faults are detected in the safety system 240 (e.g., detected during the initialization process). If faults are detected (block 408), at block 410 the safety processor 302 outputs a fault alert (e.g., via the control panel 250, via the computing device 104, etc.). The example instructions 400 may then end.

When faults are not detected (block 408), at block 411 the safety processor 302 determines whether an operator input has been received to transition the material testing system 100 from the disabled state to a setup state. For example, the safety processor 302 may require one or more specified inputs (e.g., pressing an unlock button) to transition from the disabled state. If the operator input has not been received (block 411), block 411 iterates while the material testing system 100 remains in the disabled mode to await the operator input.

When the operator input is received (block 411), at block 412 the safety processor 302 sets the state of the material testing system 100 to a setup state. In accordance with setting the setup state, the safety processor 302 enables the actuator(s) (e.g., the motor 242), restricts the actuator(s), and indicates the state as the setup state (e.g., via the state indicators 252). In some examples, the safety processor 302 controls one or more visual indicators on the control panel 250 to selectively emphasize corresponding ones of the operator selectable inputs (e.g., mode switches 254) based on the state of the material testing system 100 being the setup state. For example, the safety processor 302 may control the visual indicators to emphasize the inputs that may be used by the operator in the setup mode and deemphasize the inputs that may not be used in the setup mode.

At block 414, the safety processor 302 monitors input signals of the safety system 240 (e.g., sensor signals 320, 332, 338, 346, 350), feedback signals (e.g., feedback signals 315, 340, 360), and/or control signals (e.g., signals from the control processor 238). The safety processor 302 may monitor the signals to, for example, identify operator commands and/or conditions that would cause the safety processor 302 to recognize a change in the state of the material testing system 100.

At block 416, the safety processor 302 and/or the control processor 238 determine whether an operator control signal has been received to actuate the actuator(s) with restrictions (e.g., at a low speed or pressure). For example, the operator may select one or more mode switches 254 to actuate the crosshead 244 at a low jogging speed via the motor 242. If an operator control signal has been received to actuate an actuator (block 416), at block 418 the control processor 238 controls the actuator in accordance with restrictions (e.g., speed restrictions, force restrictions, operator clearance restrictions) applied by the safety processor 302.

At block 420, the safety processor 302 outputs an indication of the controlled actuation. For example, the safety processor 302 may control one or more of the state indicators 252 to flash, cause the computing device 104 to output an indication of the actuation, and/or provide any other indication(s).

At block 422, the safety processor 302 monitors the input signals of the safety system 240 (e.g., sensor signals 320, 332, 338, 346, 350), feedback signals (e.g., feedback signals 315, 340, 360), and/or control signals (e.g., signals from the control processor 238). At block 424, the safety processor 302 determines whether the actuation has ended. For example, the safety processor 302 may pulse the mode switches 254 to determine whether one or more of the operator controls signals has changed, and/or monitor input signals and feedback signals to identify triggering of guards and/or interlocks, faults, and/or any other event that would cause an interruption of the actuation. If the actuation has not ended (block 418), control returns to block 418 to continue to control the actuator.

When the actuation has ended (block 424), the safety processor 302 returns control to block 412.

Turning to FIG. 4B, if an operator control signal has not been received to actuate the actuator(s) with restrictions (block 416), at block 426 the safety processor 302 and/or the control processor 238 determine whether an operator control signal has been received to actuate the actuator(s) with reduced restrictions (e.g., at a high speed or pressure). For example, operator inputs may be received to jog the crosshead 244 at a higher speed and/or apply a higher clamp pressure to a test specimen via the pneumatic grips 248. Additionally or alternatively, operator and/or program inputs to perform a material test may involve setting the state of the material testing system 100 as the caution state for a time period prior to entering the testing state and performing a test. If an operator control signal has not been received to actuate the actuator(s) with reduced restrictions (block 426), control returns to block 412.

If an operator control signal has been received to actuate the actuator(s) with reduced restrictions (block 426), at block 428 the safety processor 302 sets the state of the material testing system 100 to the caution state, the grip actuator(s) 246, and reduces the actuator restriction(s) (e.g., restrictions on the grip actuator(s) 246). In some examples, the safety processor 302 may also enable the motor 242 and/or the grip actuator(s) 246 to be controlled by the control processor 238 in the caution state. The example safety processor 302 further controls the state indicators 252 to indicate that the material testing system 100 is in the caution state.

At block 430 the safety processor 302 and/or the control processor 238 determine whether an operator control signal has been received to perform a material test (e.g., with reduced restrictions) and/or another action with reduced restrictions (e.g., high speed jogging of the crosshead 244). For example, operator inputs and/or inputs from the computing device 104 may be received to perform a programmed material test involving high forces and/or high pressures.

If an operator control signal has been received to perform a material test and/or another action (block 430), at block 432 the safety processor 302 sets the state of the material testing system 100 to the testing state, and enables the actuator(s) (e.g., the motor 242, the grip actuator(s) 246).

The example safety processor 302 further controls the state indicators 252 to indicate that the material testing system 100 is in the testing state.

At block 434 the control processor 238 controls the actuator to perform the programmed test and/or another action (e.g., with reduced and/or eliminated restrictions). At block 436, the safety processor 302 outputs an indication of the ongoing material testing. For example, the safety processor 302 may control one or more of the state indicators 252 to flash, cause the computing device 104 to output an indication of the unrestricted actuation, and/or provide any other indication(s).

At block 438, the safety processor 302 monitors the input signals of the safety system 240 (e.g., sensor signals 320, 332, 338, 346, 350), feedback signals (e.g., feedback signals 315, 340, 360), and/or control signals (e.g., signals from the control processor 238). At block 440, the safety processor 302 determines whether the material test and/or other action has ended. For example, the safety processor 302 may pulse the mode switches 254 to determine whether one or more of the operator controls signals has changed, and/or monitor input signals and feedback signals to identify triggering of guards and/or interlocks, faults, and/or any other event that would cause an interruption of the actuation. If the actuation has not ended (block 440), control returns to block 434 to continue to perform the material test and/or other action.

When the actuation has ended (block 440), the safety processor 302 automatically changes the state to a restricted state, such as the setup state, and returns control to block 412.

Figure 5:
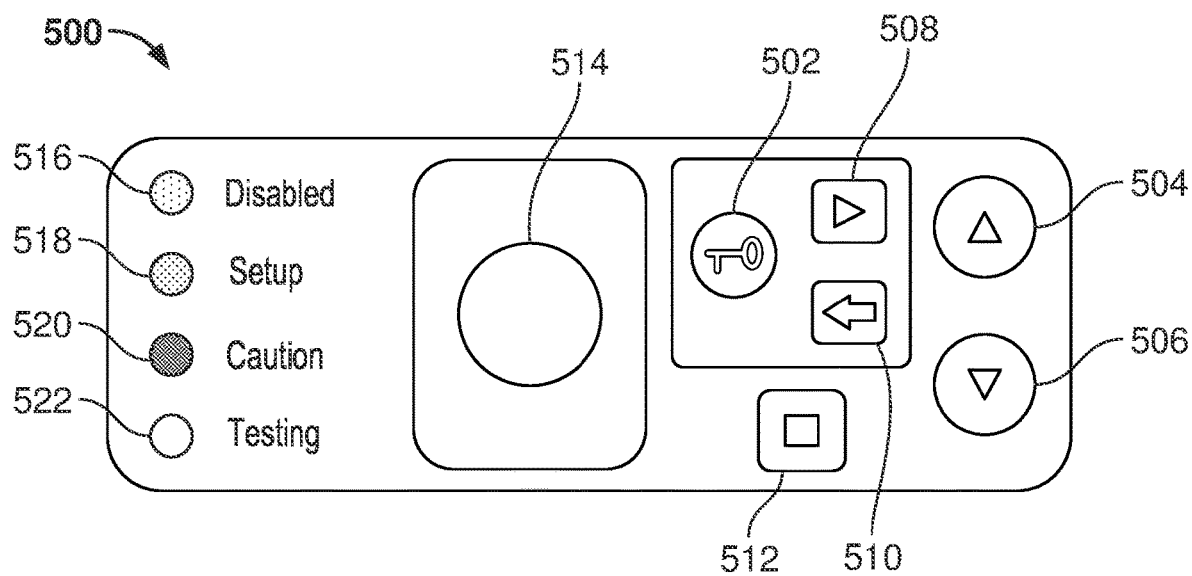
FIG. 5 illustrates an example operator interface that may be used to implement the operator interface of FIGS. 1-3.

FIG. 5 illustrates an example operator interface 500 that may be used to implement the control panel 250 of FIGS. 2 and 3. The operator interface 500 may be attached to the example test fixture 102, located proximate to the text fixture, and/or located remotely from the test fixture 102. For example, the operator interface 500 may be implemented as a built-in operator panel or switch on a base of the test fixture 102.

The example operator interface 500 includes multiple input devices (e.g., buttons, switches, etc.) which provide inputs to the control processor 238 and/or to the safety system 240 of FIGS. 2 and/or 3. The example input devices include a state control button 502, which controls the transition from a restricted state (e.g., the setup state) to an unrestricted state (e.g., the caution state, the testing state), and may be required to be used to perform actions involving the unrestricted states. The state control button 502 may be considered as an "unlock" button or safety input that enables use of the material testing system in unrestricted states.

Jog buttons 504, 506 control the motor 242 to jog the crosshead 244 in an up or down (or left and right, or directions based on any other orientation) direction (for directional crosshead movement) and/or in a right-hand or left-hand rotational direction (for rotational crosshead movement). When depressed individually, the jog buttons 504, 506 control the crosshead 244 to move up or down at a low speed (e.g., determined by the safety processor 302). When a jog button 504, 506 is depressed simultaneously with the state control button 502, the safety processor 302 may reduce the speed restriction on the motor 242 and allow jogging of the crosshead 244 at higher speeds. The example jog buttons 504, 506 may serve as directional inputs. In examples in which the crosshead 244 provides rotational force or motion, directional inputs may include rotational inputs such as right hand rotation and left hand rotation.

As used herein, received "simultaneously" refers to both inputs being activated or depressed at any given time, not necessarily that both buttons have to be initially depressed at exactly the same moment.

A start button 508 controls the control processor 238 to initiate a material test. A return button 510 controls the control processor 238 to return the crosshead 244 to a predetermined position, which may be accomplished at low speed or high speed. In some examples, the safety processor 302 requires that the start button 508 and/or the return button 510 be depressed in conjunction with the state control button 502. A stop button 512 controls the control processor 238 to stop or pause a running test. An emergency stop switch 514 may be included to implement the emergency stop switch 322 of FIG. 3.

The operator interface 500 further includes state indicators 516-522 to output an indication of a present state of the material testing system 100. The example state indicators 516-522 are lights representative of each of the states of the material testing system 100 that may be determined by the safety processor 302. In the example of FIG. 5, the operator interface 500 includes a disabled state indicator 516, a setup state indicator 518, a caution state indicator 520, and a testing state indicator 522. Each of the state indicators 516-522 is lit when the safety processor 302 determines that the material testing system 100 is in the corresponding state, while the state indicators 516-522 not corresponding to the present state are unlit.

Figure 6:
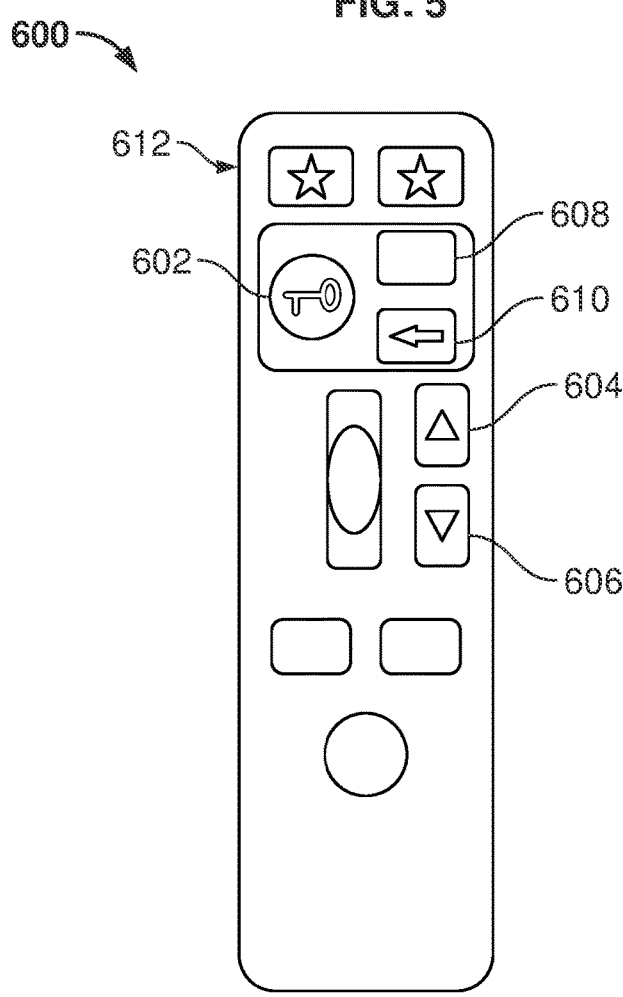
FIG. 6 illustrates another example operator interface that may be used to implement that operator interface of FIGS. 1-3.

FIG. 6 illustrates another example operator interface 600 that may be used to implement that control panel 250 of FIGS. 2 and 3. The example operator interface 600 may be a handset having a limited set of input devices (e.g., buttons, switches, etc.). The operator interface 600 may be attached to the example test fixture 102, located proximate to the text fixture, and/or located remotely from the test fixture 102. The operator interface 600 includes a state control button 602 (e.g., similar or identical to the state control button 502 of FIG. 5), jog buttons 604, 606 (e.g., similar or identical to the jog buttons 504, 506), a start button 608 (e.g., similar or identical to the start button 508), and a return button 610 (e.g., similar or identical to the return button 510).

The operator interfaces 500, 600 may include custom buttons 612, or soft keys, which provide programmable functions to the operator. In some examples, the programmable functions are subject to the restrictions of one or more of the restricted states.

Figure 7:
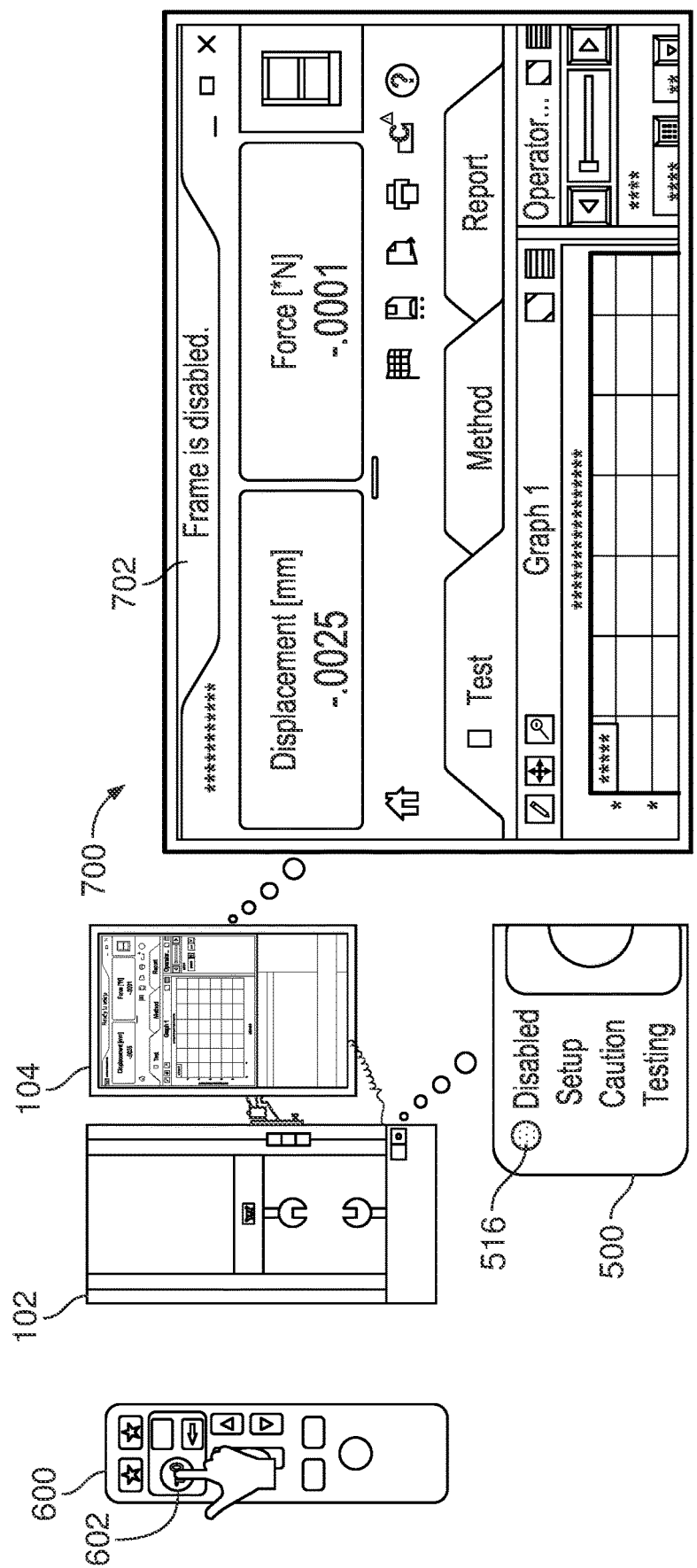
FIG. 7 illustrates the example material testing system of FIG. 1 and the operator interfaces of FIGS. 5 and 6 during a startup routine of the material test system.

FIG. 7 illustrates the example material testing system 100 of FIG. 1 and the operator interfaces of FIGS. 5 and 6 during a startup routine of the material testing system 100. The material testing system 100 is powered up and initializes in the disabled state, in which the disabled indicator 516 is illuminated (e.g., white) to indicate that the material testing system is in the disabled state. Additionally, a user interface 700 executing on the computing device 104, 200 of FIGS. 1 and 2 also includes a prominent action indicator 702 that the material testing system 100 is in the disabled state. The example operator interfaces 500 and 600 illuminate or emphasize only the buttons that provide a function when pressed. At the power up stage (e.g., in the disabled state), only the state control button 602 is functional. In addition to the power up event, the disabled state may occur when the emergency stop switch is triggered, when a guarding system is triggered, in response to a fault, and/or any other events to which the safety processor 302 responds by setting the state to the disabled state.

Figure 8:
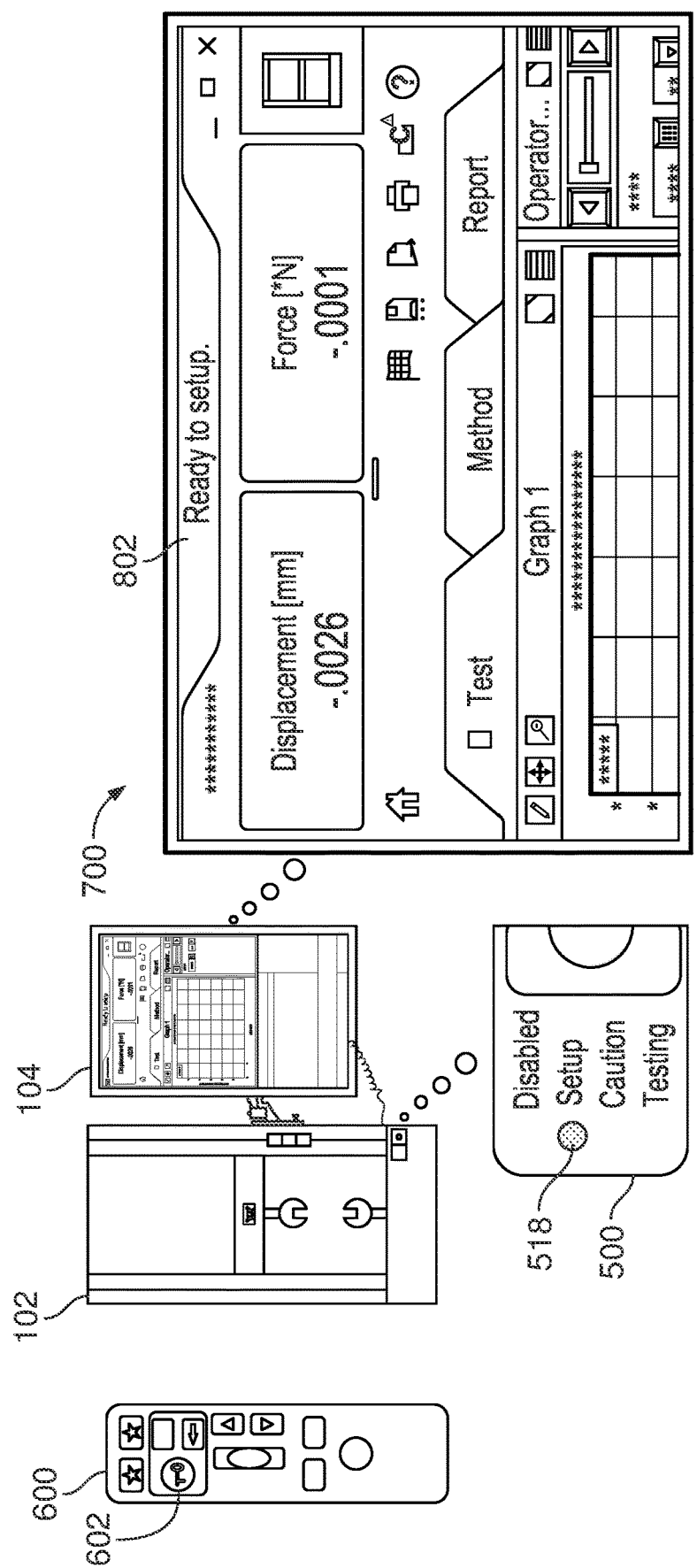
FIG. 8 illustrates the example material testing system of FIG. 1 and the operator interfaces of FIGS. 5 and 6 in the setup state of the material test system.

When the operator presses the state control button 602 button, the safety processor 302 changes the system to the setup state. FIG. 8 illustrates the example material testing system 100 of FIG. 1 and the operator interfaces 500, 600 of FIGS. 5 and 6 in the setup state of the material testing system 100. After the safety processor 302 sets the state to the setup state, the safety processor 302 controls the setup indicator 518 to illuminate (e.g., blue or green) to indicate the setup state to the operator. Additionally, the user interface 700 includes a prominent indication 802 that the material testing system 100 is in the setup state (e.g., Ready to Setup). In the setup state, additional control buttons are emphasized or illuminated (e.g., Jog) to indicate that additional functions are now available.

Figure 9:
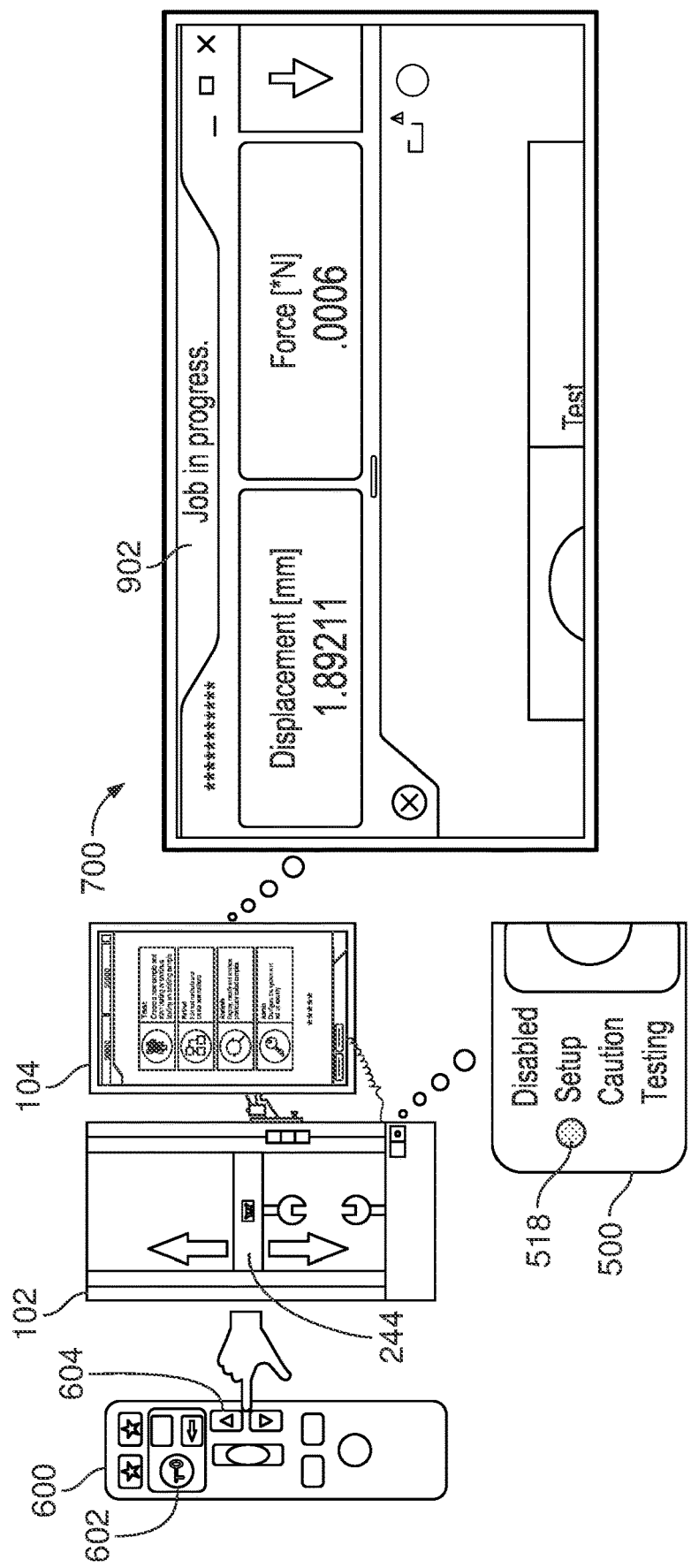
FIG. 9 illustrates the example material testing system of FIG. 1 and the operator interfaces of FIGS. 5 and 6 while jogging the crosshead with restricted actuation in the setup state.

FIG. 9 illustrates the example material testing system 100 of FIG. 1 and the operator interfaces 500, 600 while jogging the crosshead 244 with restricted actuation in the setup state. While the material testing system 100 is in the setup state (e.g., as depicted in FIG. 8), the operator may push either of the jog buttons 604, 606 on the operator interface 600 to command the control processor 238 to move the crosshead 244 into a desired position. When either of the jog buttons 604, 606 is pressed, the safety processor 302 restricts the movement of the crosshead 244 (via motor 242) to a limited jog speed. During the jogging, the user interface 700 includes a prominent indication 902 that the material testing system 100 is performing the jogging movement, which may include text, flashing the indication 902 and/or the setup indicator 518, and/or any other emphasis.

Figure 10:
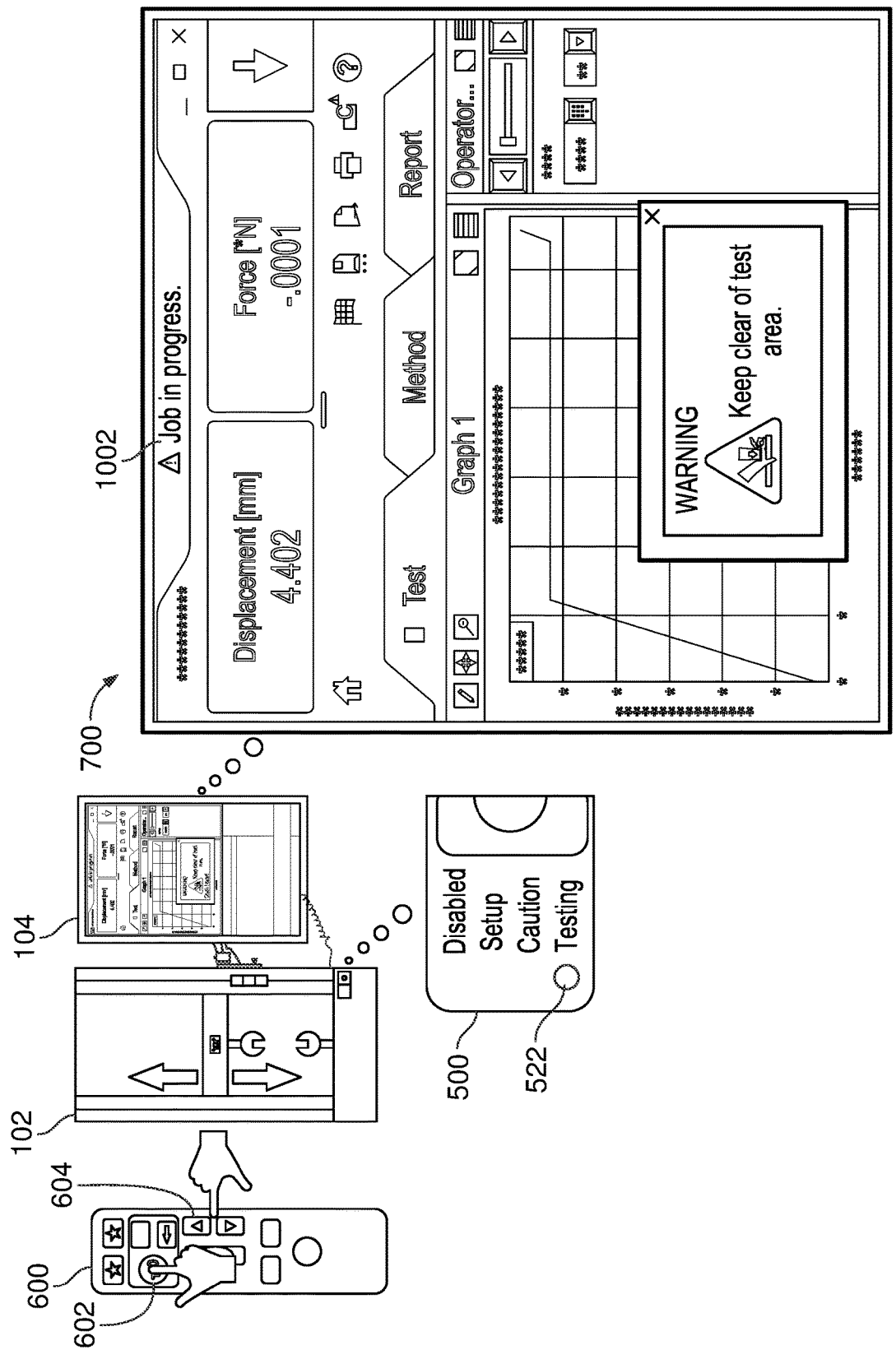
FIG. 10 the example material testing system of FIG. 1 and the operator interfaces of FIGS. 5 and 6 while jogging the crosshead with reduced restrictions in the caution or testing state.

FIG. 10 the example material testing system 100 of FIG. 1 and the operator interfaces of FIGS. 5 and 6 while jogging the crosshead 244 with reduced restrictions in the caution or testing state. For example, in some applications, the crosshead 244 must be moved relatively long distances, which can take a substantial amount of time at restricted speeds. To accommodate the practical need, reduce the travel time, and eliminate motivation to attempt to bypass the safety system 240, the safety processor 302 may reduce restrictions in one or more unrestricted states to allow for a high speed jog of the crosshead 244. While the material testing system 100 is in the setup state illustrated in FIG. 9, the operator may simultaneously press the state control button 602 and one of the jog buttons 604, 606. In response to the combination of the buttons 602 and 604 or 606, the control processor 238 controls the motor 242 to move the crosshead 244, and the safety processor 302 sets the state of the material testing system 100 to the testing state (or the caution state), and reduces the restrictions applied to the motor 242. As a result, the motor 242 is permitted to move the crosshead at a higher speed in the commanded direction. The safety processor 302 will further control the testing indicator 522 (or the caution indicator 520) to light and/or flash, and the user interface software includes a prominent hazard indicator 1002 that the material testing system 100 is performing the jogging movement, which may include text, flashing the indication 1002 and/or the testing indicator 522 (or the caution indicator 520), and/or any other emphasis. In some examples, the hazard indicator 1002 may continuously display active warning label warning of a specific potential hazard.

If the operator releases the state control button 602, the jogging movement may continue with reduced restrictions in the testing state. When the operator releases the jog button 604, 606, the control processor 238 stops the jogging movement and the safety processor 302 automatically sets the state of the material testing system 100 to the setup state and restores the restrictions. In some other examples, when the operator releases either of the state control button 602 or the jog button 604, 606, the safety processor 302 automatically sets the state of the material testing system 100 to the setup state and restores the corresponding restrictions.

Figure 11:
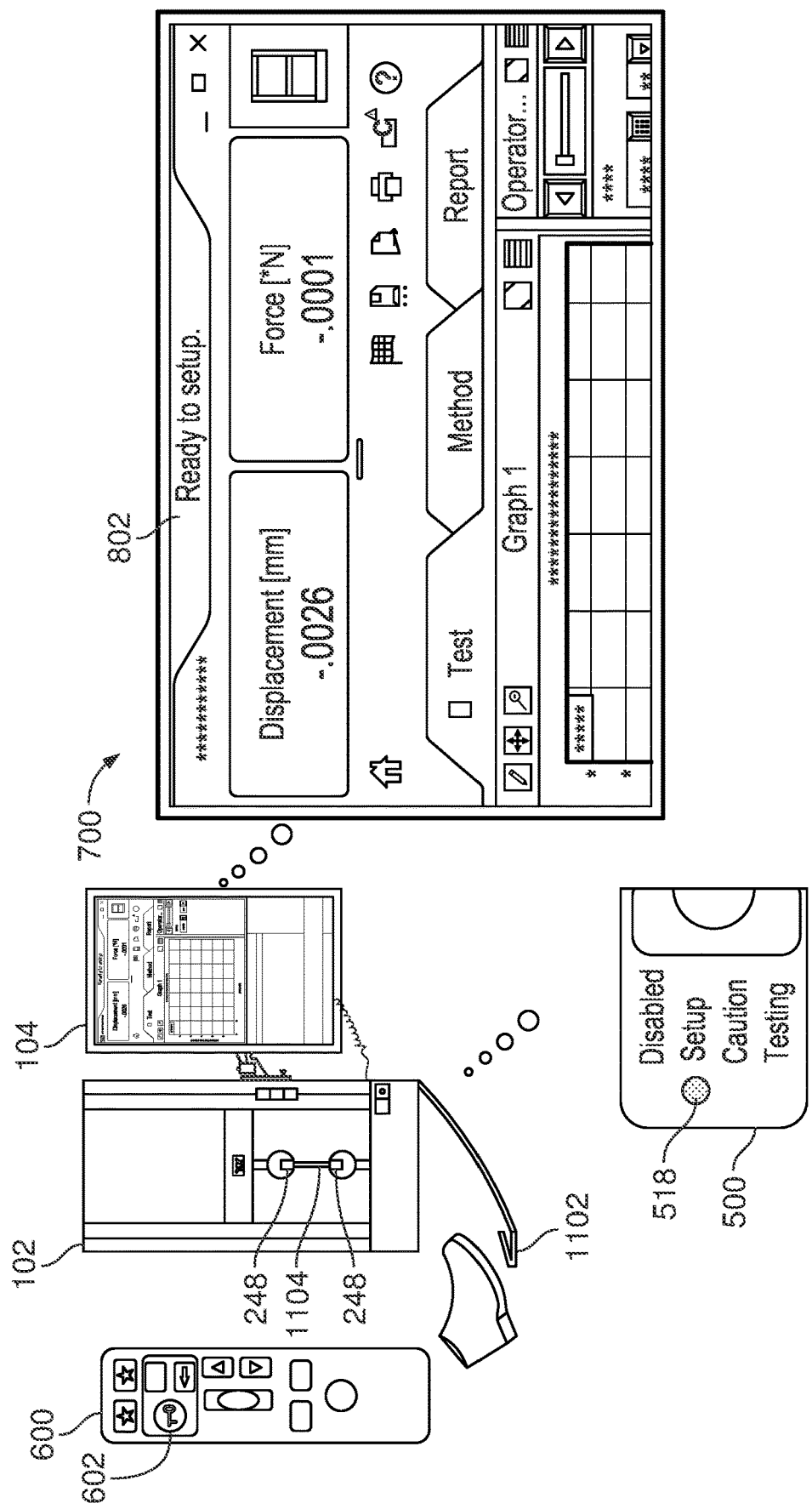
FIG. 11 illustrates the example material testing system of FIG. 1 and the operator interfaces of FIGS. 5 and 6 while controlling actuation of pneumatic grips with restricted actuation in the setup state.

FIG. 11 illustrates the example material testing system 100 of FIG. 1 and the operator interfaces 500, 600 while controlling actuation of pneumatic grips (e.g., the pneumatic grips 248 of FIG. 2) with restricted actuation in the setup state. As illustrated in FIG. 11, the material testing system 100 is in the setup state (similar to FIG. 8), as indicated by the illuminated setup indicator 518 and the indicator 802 in the user interface 700. The example of FIG. 11 further includes an operator interface in the form of a foot pedal 1102 that may be used by the operator to control the grip actuator(s) 246 to close and/or open the pneumatic grip(s) 248. The operator inserts a specimen 1104 and depresses the foot pedal 1102 to close the pneumatic grips 248. The example control processor 238 controls the grip actuators 246 to close the pneumatic grips 248 on the specimen 1104. In the setup state, the safety processor 302 controls the grip controller 354 to restrict the pneumatic pressure that may be applied by the grip actuator(s) 246 and the grip force that may be applied by the pneumatic grip(s) 248. While the state of the material processing system 100 remains in the setup state, the safety processor 302 monitors the applied pressure (e.g., via the pressure sensor 358) to ensure the pneumatic pressure does not exceed the upper limit.

Figure 12:
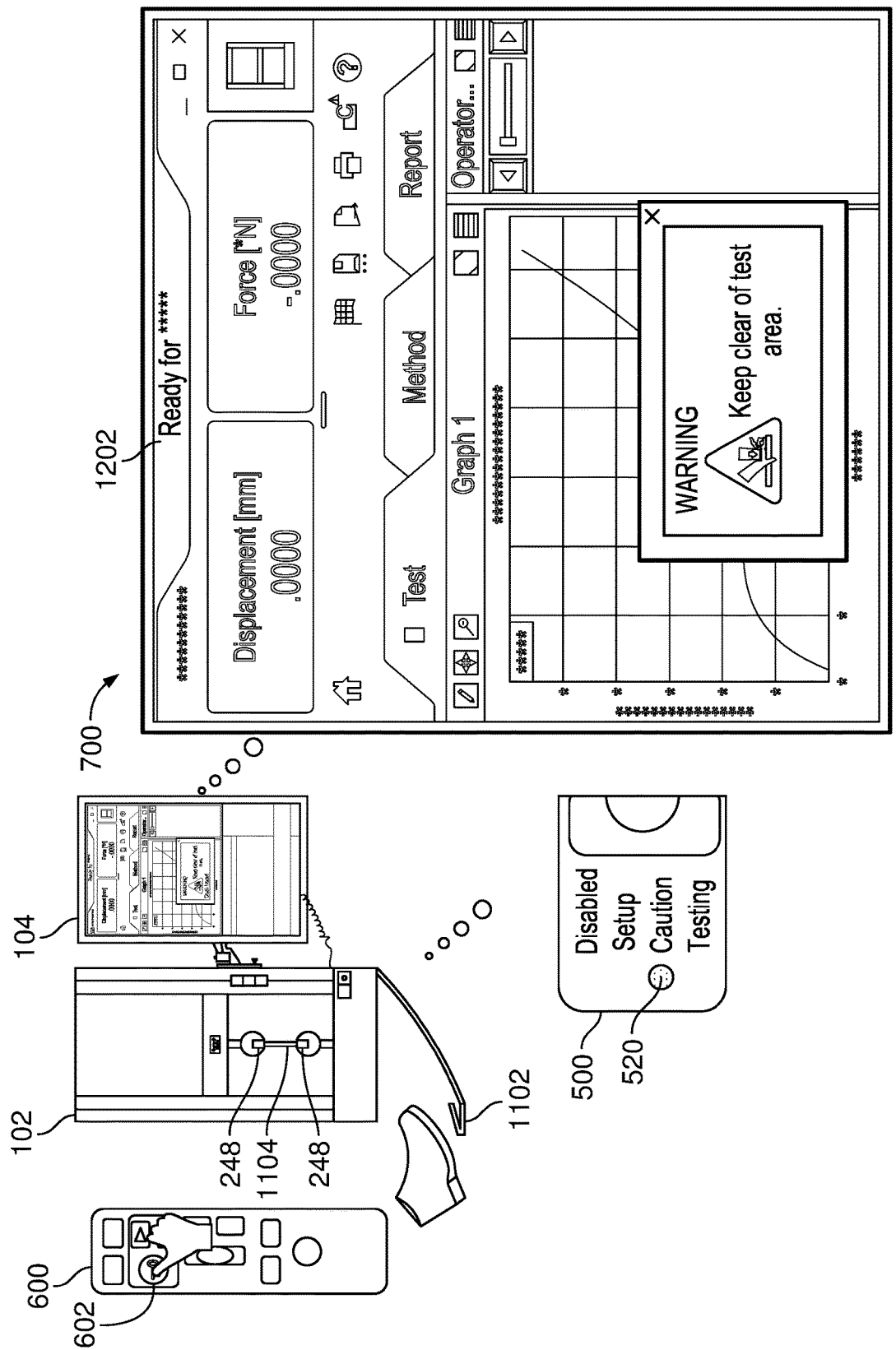
FIG. 12 illustrates the example material testing system of FIG. 1 and the operator interfaces of FIGS. 5 and 6 while controlling actuation of pneumatic grips with reduced restrictions in the caution or testing state.

FIG. 12 illustrates the example material testing system 100 of FIG. 1 and the operator interfaces 500, 600 while controlling actuation of the pneumatic grips 248 with reduced restrictions in the caution or testing state. In the example of FIG. 12, the specimen 1104 is held in the pneumatic grips 248 and closed at the low pressure setting (as discussed with reference to FIG. 11). The operator may start the high pressure clamping process by pressing the state control button 602. The safety processor 302 identifies the pushing of the state control button 602 and, in response, reduces the restrictions on the grip actuator 246 to enable an increased grip pressure. The safety processor 302 also controls the caution indicator 520 (e.g., yellow), and the user interface 700 displays a prominent indicator 1202 that the material testing system 100 is in the caution state (or another unrestricted state), which may include text, flashing the indication 1202 and/or the caution indicator 520, and/or any other emphasis. The safety processor 302 and/or the control processor 238 may emphasize the start buttons 508, 608 and/or the return buttons 510, 610 to indicate that the buttons 508, 608, 510, 610 are available to be used (e.g., will perform a function when pushed) by the operator.

After performing the high pressure clamping, the example safety processor 302 may set the state of the material testing system 100 to the setup state and apply the associated restrictions to the actuator(s) 242, 246.

Figure 13A:
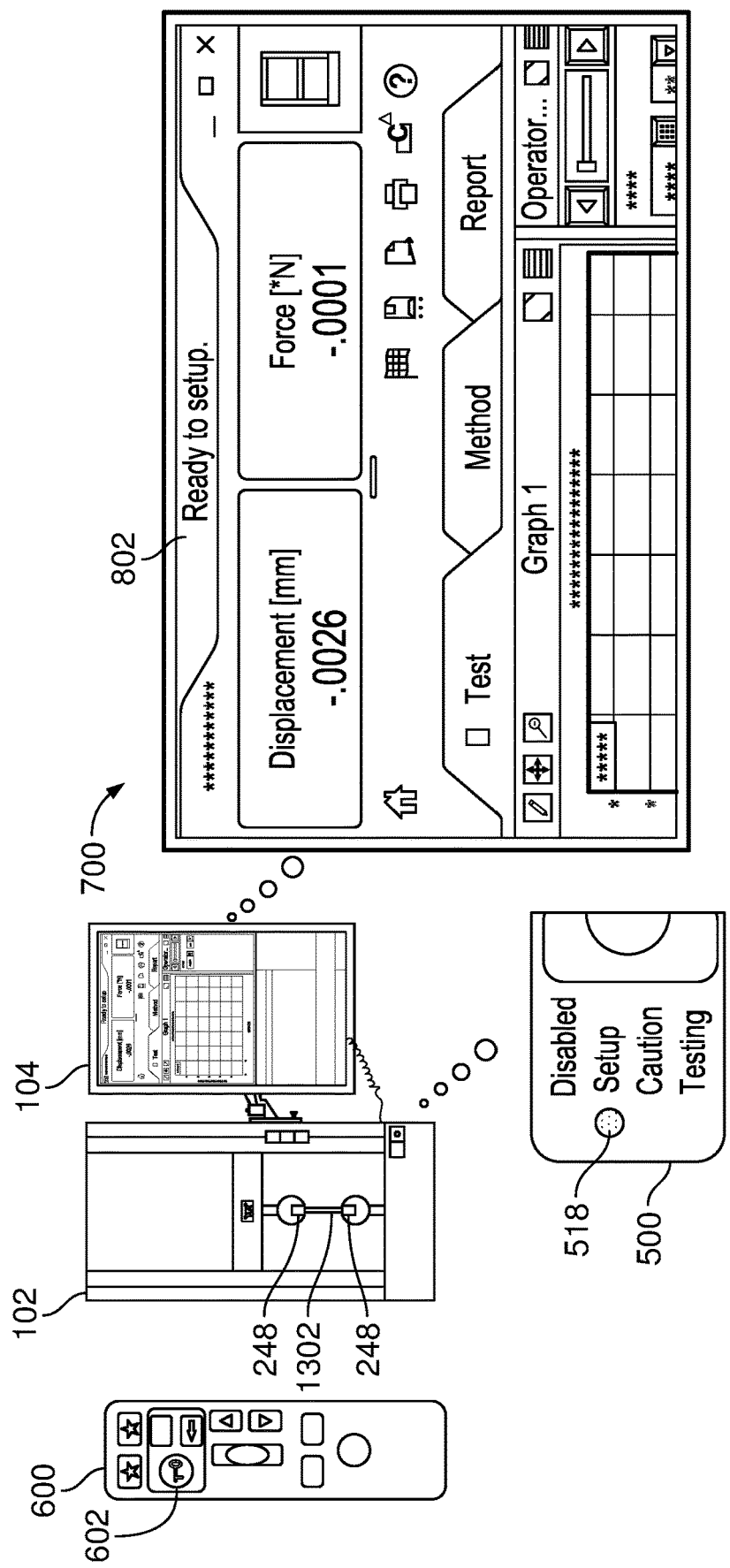
FIGS. 13A, 13B, and 13C illustrates the example material testing system of FIG. 1 and the operator interfaces of FIGS. 5 and 6 while progressing from the setup state to the caution state and the testing state to initiate a material test.
Figure 13B:
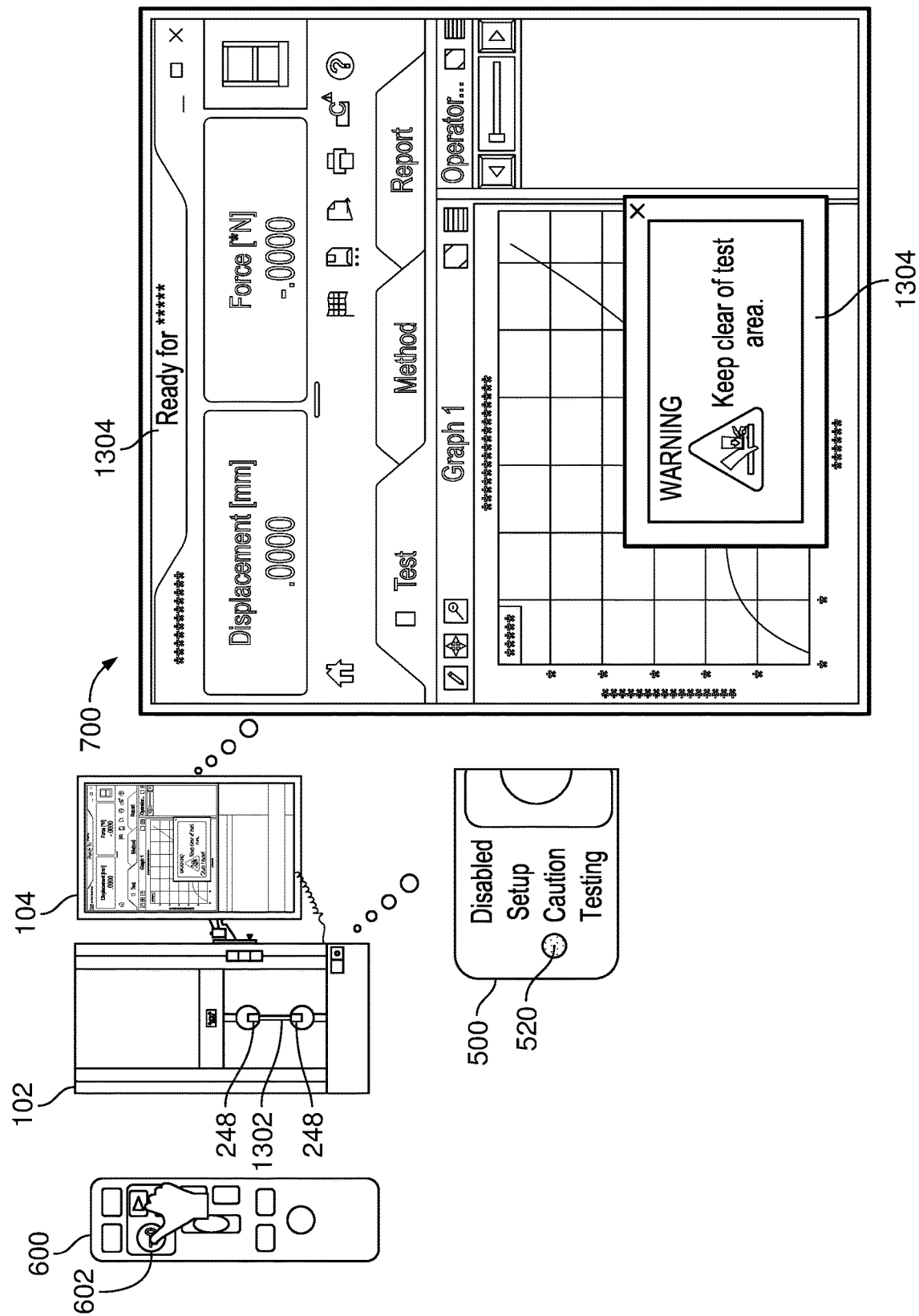
Figure 13C:
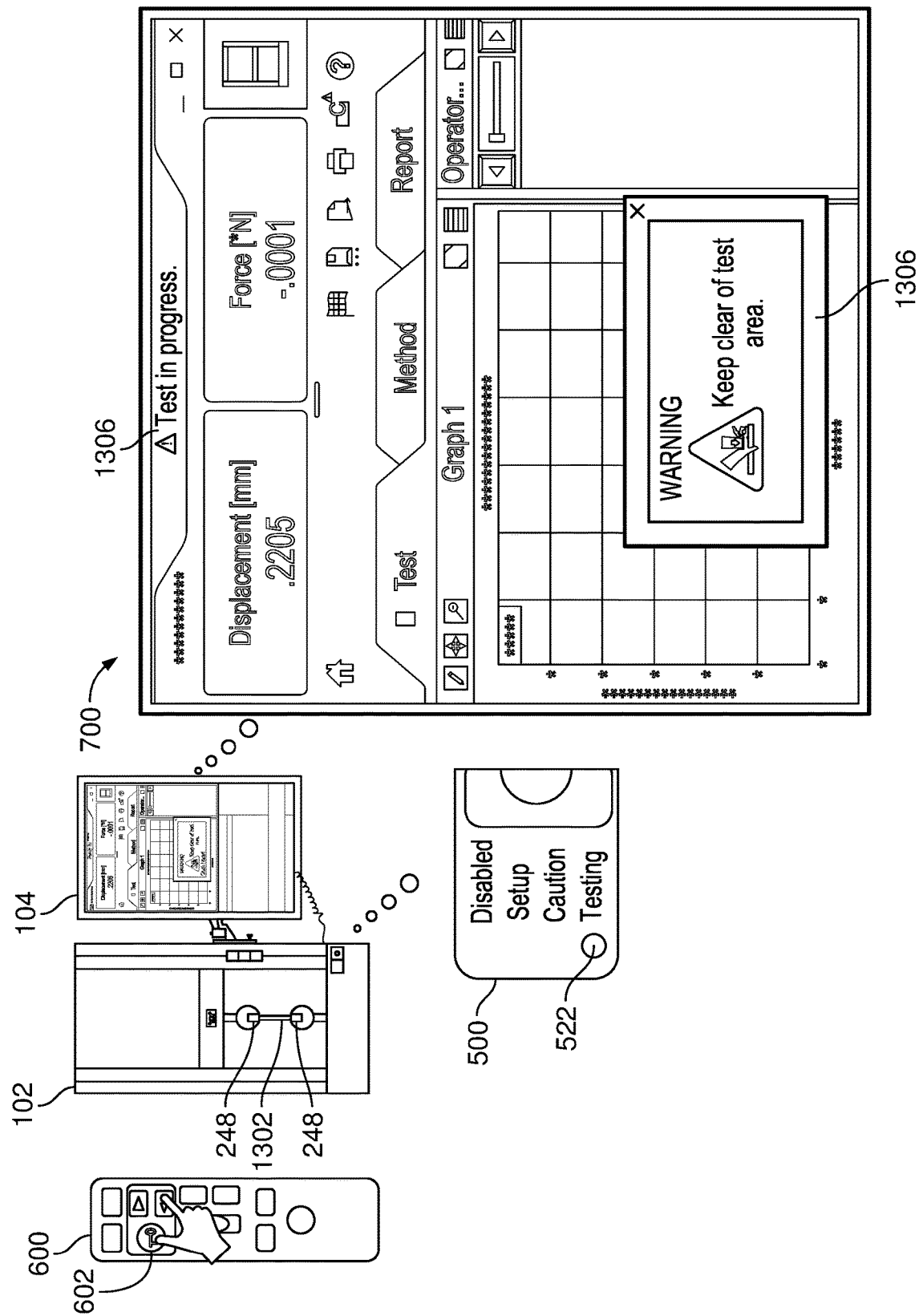

FIGS. 13A, 13B, and 13C illustrates the example material testing system 100 of FIG. 1 and the operator interfaces 500, 600 while progressing from the setup state to the caution state and the testing state to initiate a material test. The example setup state illustrated in FIG. 13A may be similar or identical to the setup state illustrated in FIG. 8, except that a specimen 1302 is held in the grips 248 and closed at the high pressure setting.

The operator may start the material test by first pressing the state control button 602 and then the start button 608. The safety processor 302 controls the caution indicator 520 to illuminate in response to the press of the state control button 602 (FIG. 13B), and the user interface 700 displays an indication 1304 of the caution state (e.g., a yellow border and/or active warning overlay). In response to subsequent press of the start button 608, the safety processor 302 then transitions to illuminating the testing indicator 522 (FIG. 13C) and the user interface 700 displays an indication 1306 of the testing state (e.g., a red border and/or active warning overlay). The control processor 238 may then proceed to perform the configured test when the safety processor 302 sets the state to the testing state (e.g., an unrestricted drive mode). The overlay in the user interface 700 may be removed after a period of time, to enable the user to observe the ongoing test measurements on the user interface 700. However, the safety processor 302 may continue to provide other visual, audible, and/or otherwise perceptible warnings during the testing (e.g., displaying or flashing the testing indicator 522, displaying or flashing a red border as the indication 1306 on the user interface 700.

In some examples, the control processor 238 may be configured with a test method that pauses the test for operator interaction with the specimen 1302, such as removal of an extensometer. When the test reaches the point where the interaction is required, the control processor 238 pauses the test (e.g., ceases actuation by the motor 242). When the pause point is reached, the safety processor 302 sets the material testing system 100 to the setup state and the user interface 700 displays an indication that the test is paused. Additionally or alternatively, the safety processor 302 may control the setup indicator 518 to visually indicate (e.g., light up, flash) to indicate the test is not complete but in the paused state.

The operator may then resume the test by simultaneously pressing the state control button 602 (e.g., unlock) and the start button 608. The safety processor 302 and the control processor 238 may then resume the test using the same sequence of indicators as to start the test as described above. In some examples, when the state control button 602 is pressed, the user interface 700 displays an indication that the system is in the caution state and that a test is paused.

When the test has been completed, the safety processor 302 automatically sets the state to the setup state and applies the associated restrictions.

Figure 14A:
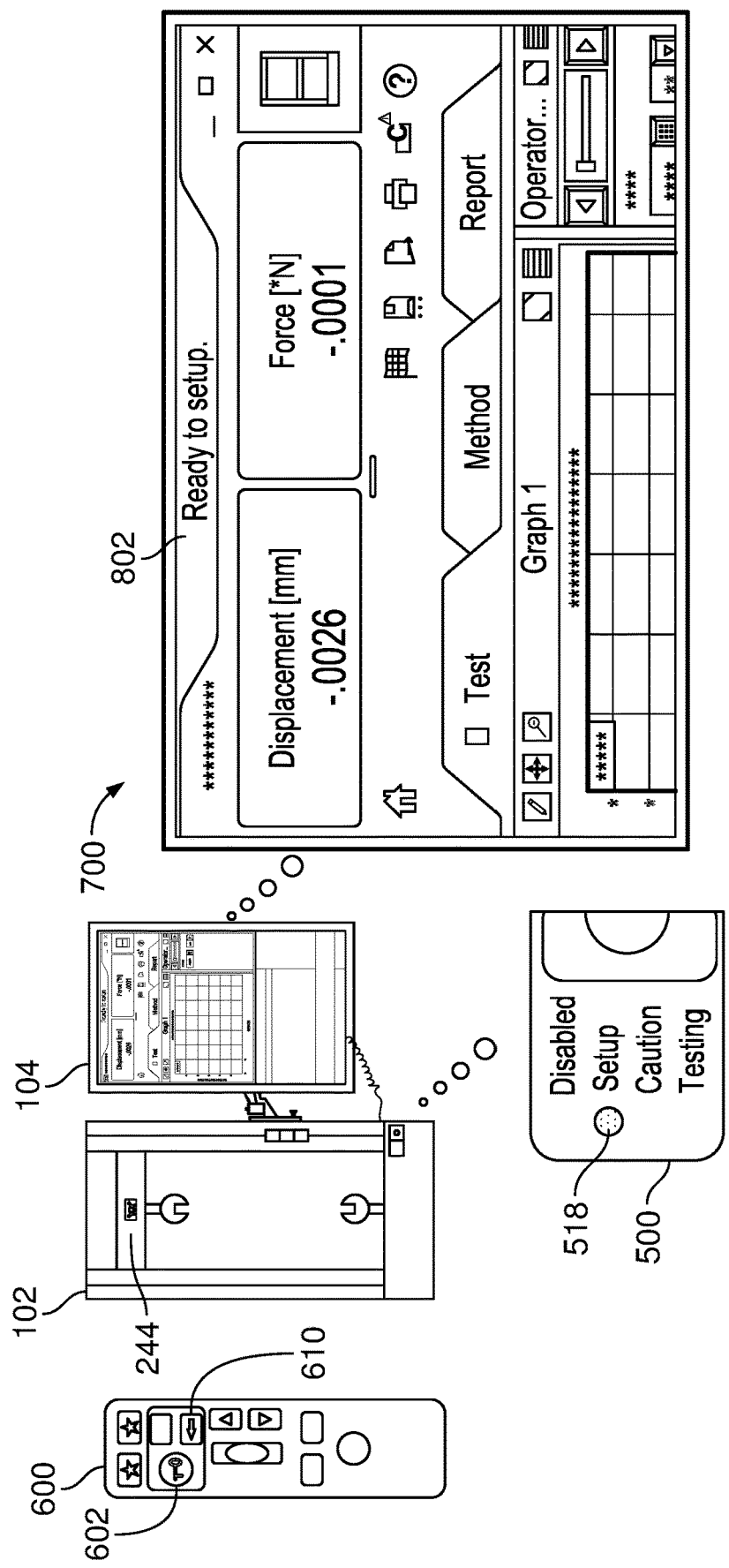
FIGS. 14A, 14B, and 14C illustrates the example material testing system of FIG. 1 and the operator interfaces of FIGS. 5 and 6 while progressing from the setup state to the caution state and the testing state to return the crosshead to a desired state.
Figure 14B:
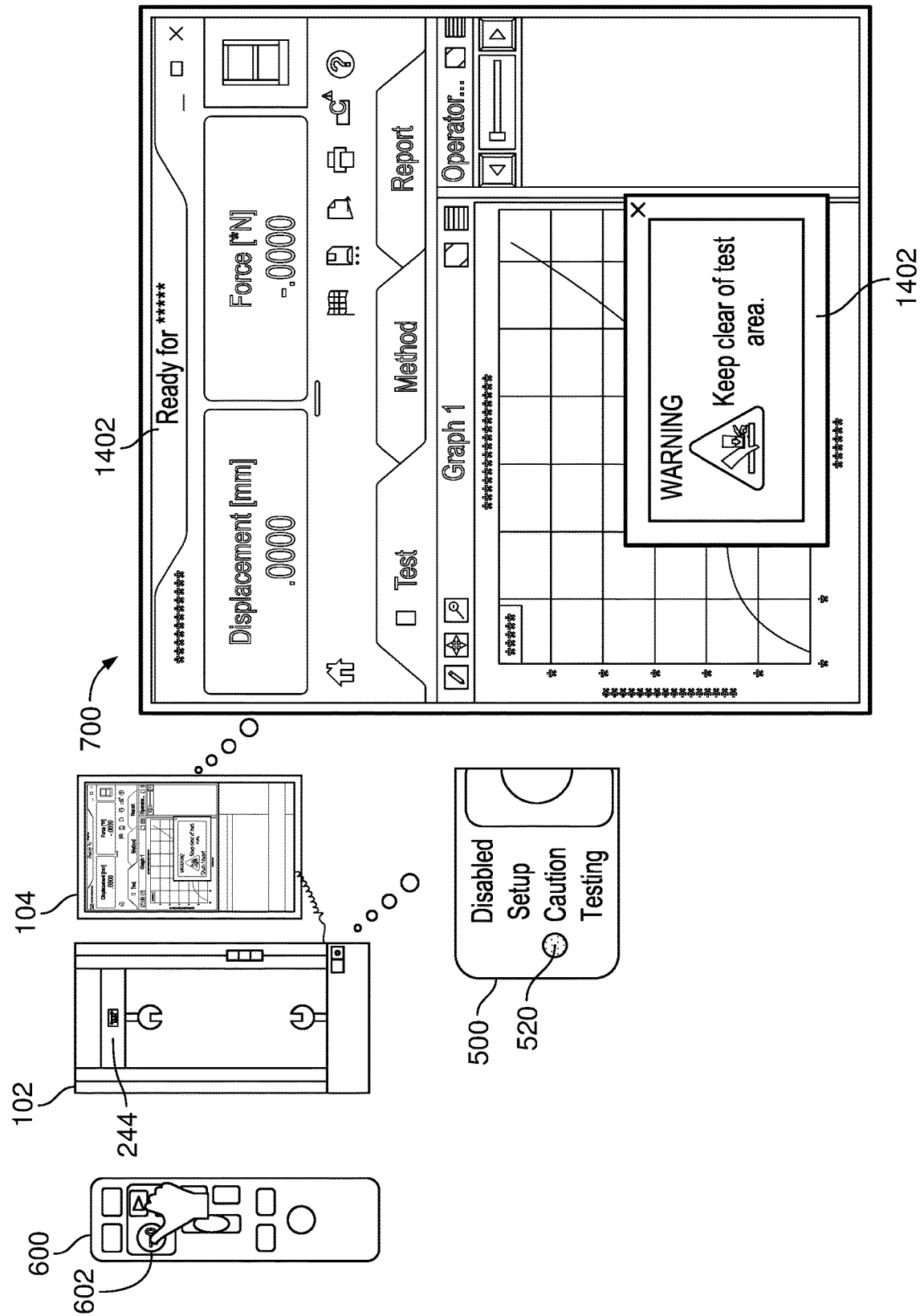
Figure 14C:
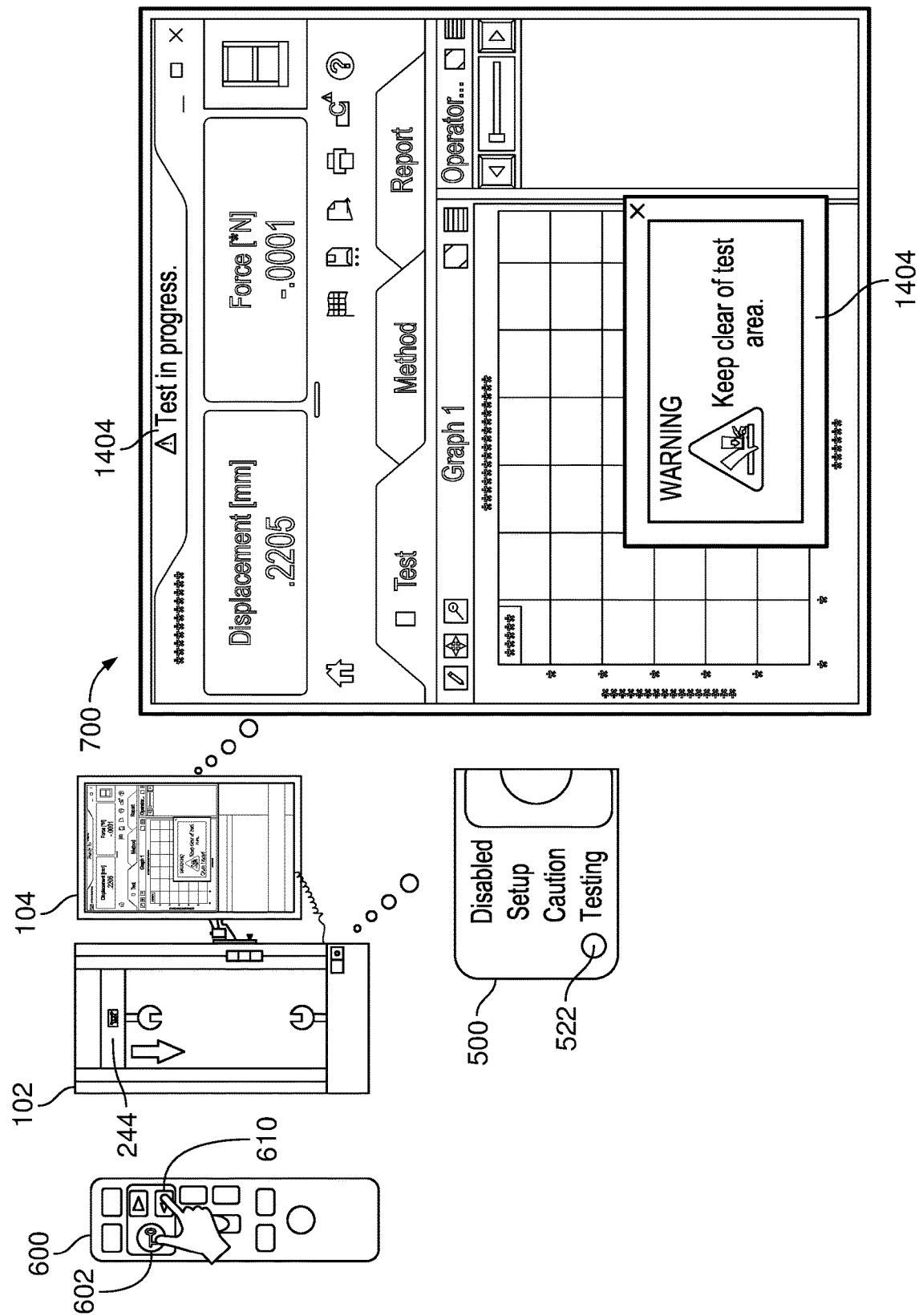

FIGS. 14A, 14B, and 14C illustrates the example material testing system of FIG. 1 and the operator interfaces 500, 600 of FIGS. 5 and 6 while progressing from the setup state to the caution state and the testing state to return the crosshead 244 to a desired position. After a previous test ended, the material testing system 100 is set to the setup state, which is indicated by the illumination of the setup indicator 518. The crosshead 244 may be positioned, for example, at the location at which the prior test finished. In the setup state, the operator is permitted to remove specimens and/or interact with the test fixture 102 and/or the operator interfaces 500, 600, with the restrictions applied by the safety processor 302.

When the operator is ready to return the 244 crosshead to the desired positon (e.g., to run another test), the operator may initiate the return by pressing the state control button 602 and the return button 610 simultaneously or sequentially. The safety processor 302 controls the caution indicator 520 to illuminate in response to the press of the state control button 602 (FIG. 14B), and the user interface 700 displays an indication 1402 of the caution state (e.g., a yellow border and/or active warning overlay). In response to subsequent press of the return button 610, the safety processor 302 then transitions to illuminating the testing indicator 522 (FIG. 14C) and the user interface 700 displays an indication 1404 of the testing state (e.g., a red border and/or active warning overlay). The control processor 238 may then proceed to control the motor 242 to move the crosshead 244 with reduced or eliminated speed restrictions when the safety processor 302 sets the state to the testing state (e.g., an unrestricted drive mode).

After the crosshead 244 has reached the desired position (e.g., a test starting position), the safety processor 302 automatically sets the state to the setup state.

Although the material testing system 100 consistently (e.g., constantly) has the safety functions enabled and operating, some of the parameters used by the safety system 240 may be adjustable to provide desired interactions (e.g., slower jog speeds than a default jog speed). The example computing device 104 may enable an administrator or other authorized operators to control some parameters of the safety system 240.

While the computing system 104 may provide an interface for configuration of the safety system parameters, the example computing system 104 does not participate in the enforcement of the parameters. To modify parameters of the safety system 240 from the default parameters, the authorized operator or administrator may be required to enable a software security system that authenticates the authorized operator attempting to make changes.

When the security system is enabled, the operator may modify parameters such as the jog rate, grip pressure, point of control (e.g., local or remote), interlock behavior (moveable guard), and/or whether to dismiss notifications when performing actions such as starting a material test. Before and/or after modification, the security system requires the input of valid authentication information to permit the modification of the settings to be committed to the safety system 240 for enforcement. The safety system 240 may be shut down to store configuration changes, resulting in the changing of the state of the material testing system 100 to the disabled state.

The security system for modification is a keyless system, which allows an administrator or other authorized operator to configure the safety system in a manner that is consistent with a particular risk assessment, and prevents a standard operator from overriding these settings. The keyless administrative function prevents accidental and/or purposeful misuses that can occur with conventional safety systems that use a key or selection control.

Returning to FIG. 3, in some examples, the grip actuator(s) 246 are implemented using a manifold and multiple fill and/or exhaust valves and/or pressure sensors and/or pressure switches to control application and/or release of pneumatic pressure to the pneumatic grip(s) 248. An example manifold, example fill and exhaust valves, and example pressure switches that may be used to implement the grip actuator(s) 246 are disclosed in U.S. Patent Publication No. 2019/0113427, filed Mar. 31, 2017. The entirety of U.S. Patent Publication No. 2019/0113427 is incorporated herein by reference.

The example manifold and multiple fill and/or exhaust valves and/or pressure sensors and/or pressure switches may be coupled to the safety processor 302 to control high and/or low pressure states of the pneumatic grip(s) based on the states discussed above.

Figure 15:
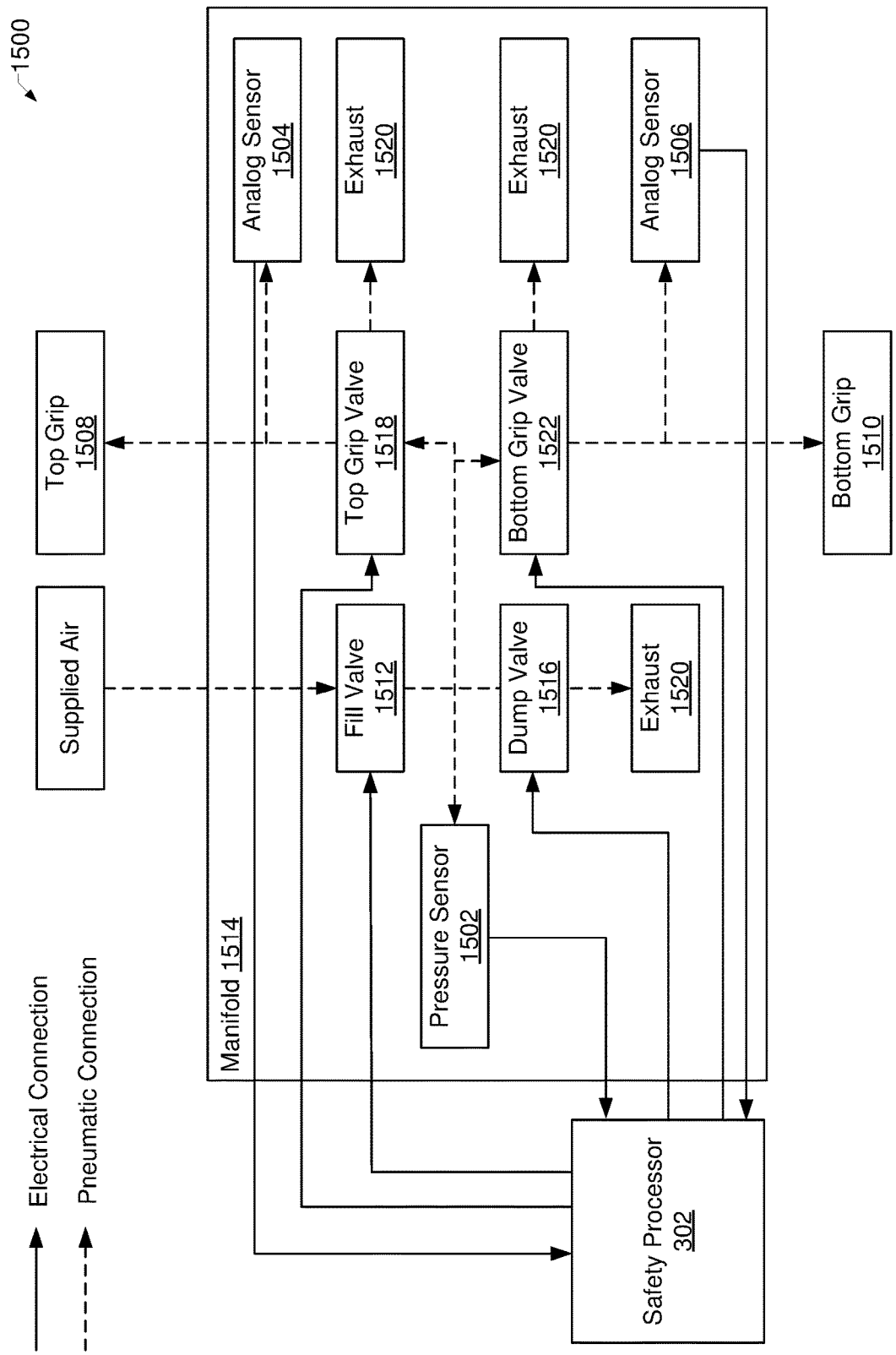
FIG. 15 is a block diagram of an example pneumatic grip system that may be used to implement a portion of the safety system of FIG. 3.

FIG. 15 is a block diagram of an example pneumatic grip system 1500 that may be used to implement a portion of the safety system of FIG. 3. The example pneumatic grip system 1500 includes the safety processor 302, which receives inputs from a main pressure sensor 1502 and pressure sensors 1504, 1506 at top and bottom pneumatic grips 1508, 1510.

The safety processor 302 also controls a fill valve 1512 to selectively permit air pressure into a manifold 1514, from which the air can be directed to the top grip or the bottom grip. The safety processor 302 controls a dump valve 1516 to depressurize the system. The safety processor 302 also controls a top grip valve 1518 to direct air pressure to the top grip 1508 and/or to relieve pressure from the top grip 1508 via an exhaust 1520, and controls a bottom grip valve 1522 to direct air pressure to the bottom grip 1510 and/or to relieve pressure from the bottom grip 1510 via the exhaust 1520. The exhausts 1520 for the dump valve 1516, the top grip valve 1518, and the bottom grip valve 1520 may be combined or separate exhaust channels.

The grip fill control valves 1512, 1516, 1518, 1522 may be controlled by the safety processor 302 and/or by another processor, either of which may implement a task or subroutine to control the grip pressures. Example valves that may be used for the fill and/or exhaust valves are solenoid valves, such as proportional valves. In operation, the safety processor 302 controls the fill valves 1512, 1518, 1522 and exhaust valves 1516. When the fill solenoid of the fill valve 1512 is deenergized (e.g., a FALSE command value), the incoming house air supply is blocked. When the fill solenoid of the fill valve 1512 is energized (e.g., a TRUE command value), the air supply is passed through to the main interior manifold piping. When the dump solenoid of the dump valve 1516 is deenergized (e.g., a FALSE command value), the main interior manifold piping is connected to the external exhaust port. When the dump solenoid of the dump valve 1516 is energized (e.g., a TRUE command value), the main interior manifold piping is blocked from the exhaust port. These solenoids have 4 possible states.

Fill command=false, Dump command=false:Dump pressure (default state)
Fill command=false, Dump command=true:Hold pressure
Fill command=true, Dump command=false: Not used. This state should be avoided as it would cause the input air supply to be directly vented out the exhaust port
Fill command=true, Dump command=true: Fill pressure The 3 operational states that may be controlled by the safety processor 302 are: Fill, Dump, and Hold. Controlling the system in the fill state increases the internal pressure according to the amount of time in the fill state. Controlling the system in the dump state decreases the internal pressure according to the amount of time in the dump state. Controlling the system in the hold state maintains the current internal pressure minus any small leakage of air or further settling.

Because electromechanical solenoids do not change state instantaneously, the safety processor 302 may use transition times adjust the timing of the fill, dump, and hold state transitions.

The pressure sensors 1502, 1504, 1506 may be implemented using analog-to-digital converters, which receive an analog air pressure sample from a pressure sensor, and converts the analog sample to a digital sample value.

Figure 16A:
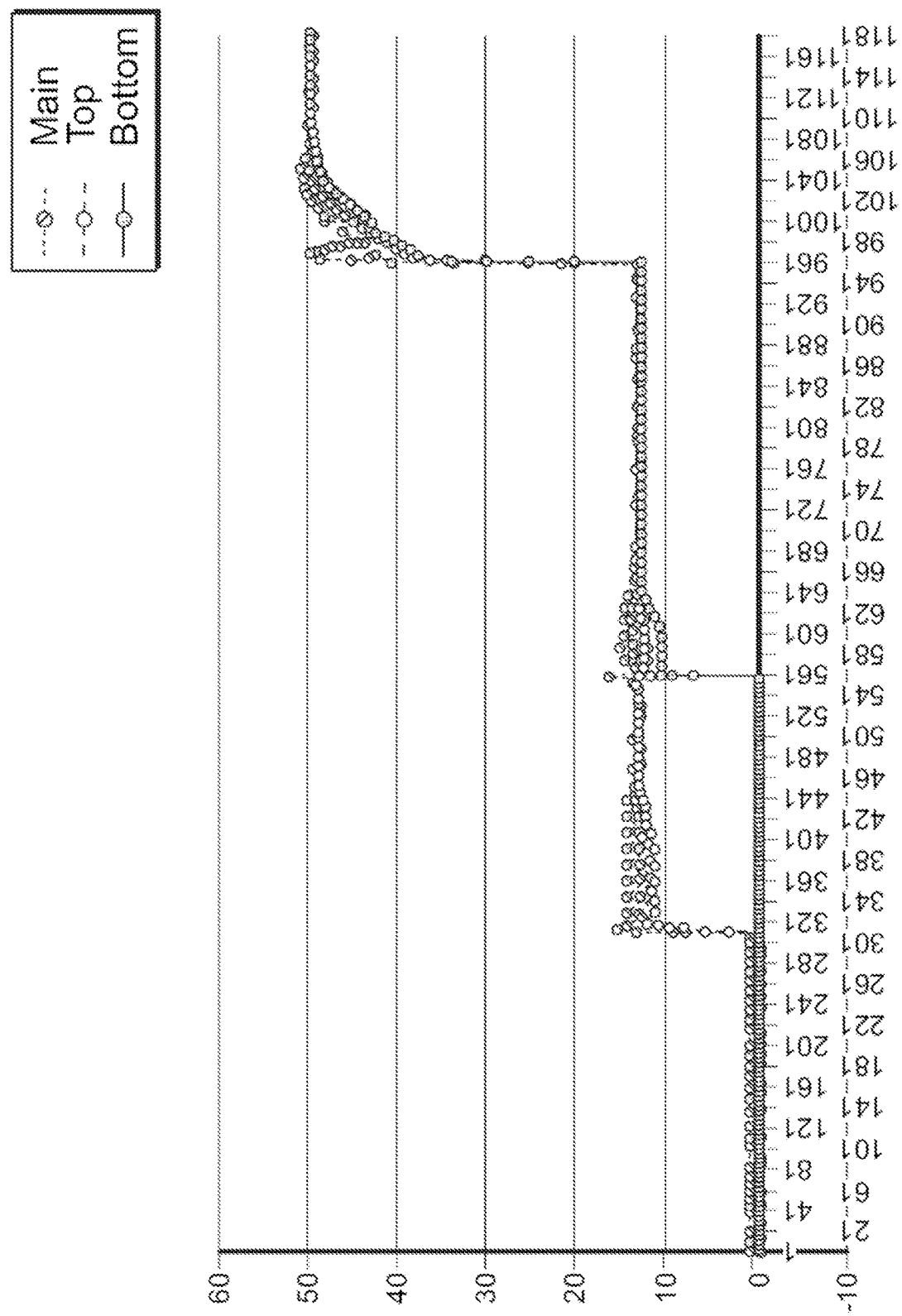
FIG. 16A is a graph illustrating manifold pressures and grip pressures during a conventional pneumatic grip pressurization process.

One drawback of conventional pneumatic grip systems is that the pressure sensor is located in the manifold and not at the body of the grips, and conventional control systems do not account for the delay between the air pressure entering the manifold and the air pressure reaching the pneumatic grips. As illustrated in FIG. 16A, the conventional pneumatic grip control system is commanded to go to a first pressure. The pressure sensors located in the manifold read the increased pressure almost immediately. However, there are hoses that connect the manifold to the body of the grip, which creates substantial delay in pressurizing the grip. For example, there may be hundreds of milliseconds to seconds of delay for the grips to reach the same pressure as the manifold. As a result, the true pressure at the grips is not known during pressurization.

Figure 16B:
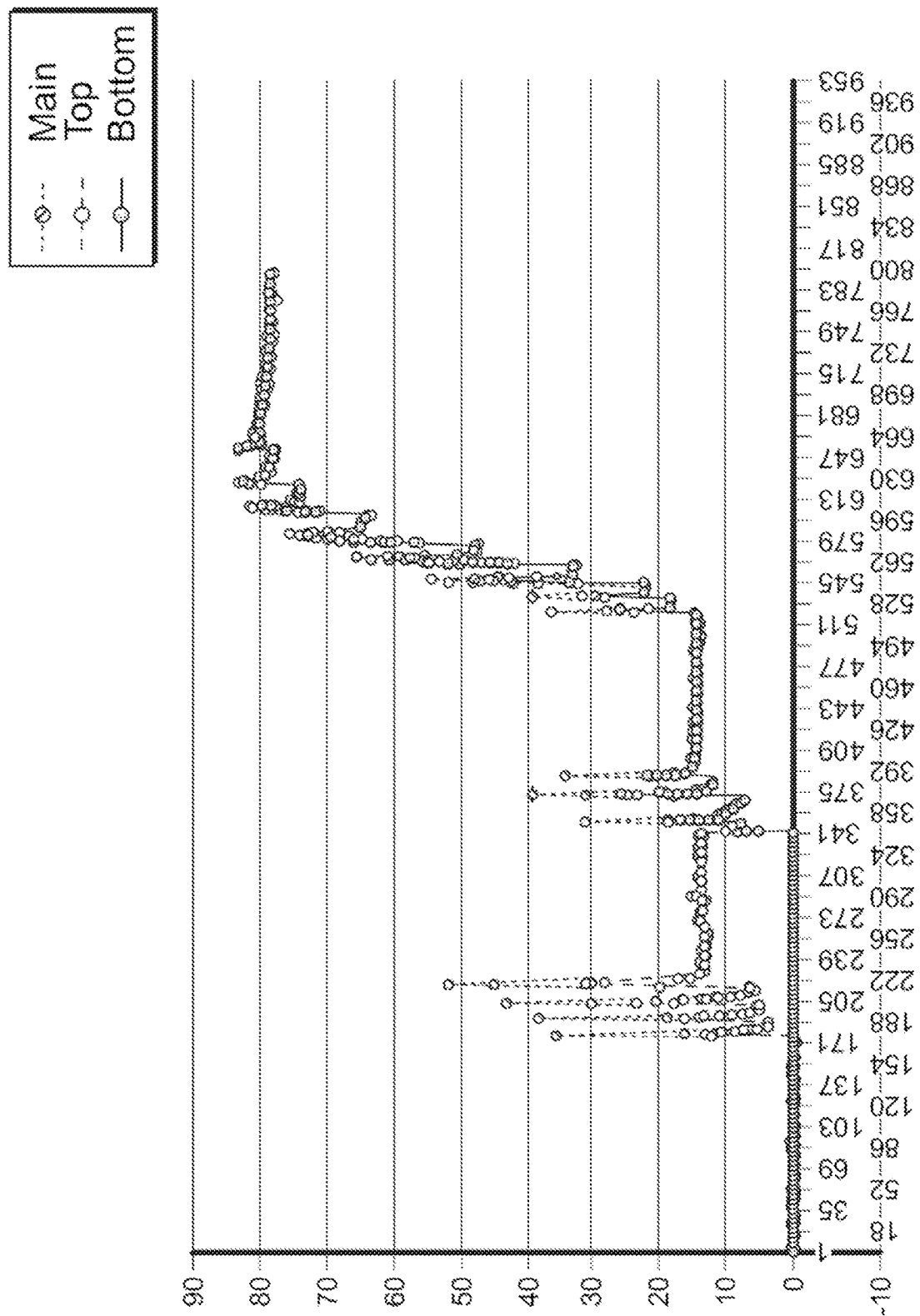
FIG. 16B is a graph illustrating manifold pressures and grip pressures during a disclosed example pneumatic grip pressurization process.

Disclosed examples overcome the delayed pressure information by applying air pressure at intervals. For example, the safety processor 302 may control the fill valve 1512, the top grip valve 1518, and/or the bottom grip valve 1522 by energizing the grip solenoids several times to let short bursts or pulses of air into the grips and then holding to let the system stabilize. FIG. 16B illustrates an example graph showing bursts of air used to increase the grip pressure. The safety processor 302 monitors the rate of change (e.g., the slope) of the pressure as the pressure falls during the hold. When the slope of the line is stabilized (e.g., the slope is sufficiently flat, or less than a threshold value) the true pressure reading of the body of the grips 1508, 1510 has been reached.

Because the main pressure sensor 1502 is located very close to the full pressure air inlet, the pressure measured by the main pressure sensor 1502 will rise quickly to be close to the external pressure as long as the fill valves 1512, 1518, 1522 are in the fill state. The sensors 1504, 1506 will not accurately reflect the pressure within the grips 1508, 1510 unless the valves 1512, 1518, 1522 are switched to a hold state for some period of time to let the pressure within the system stabilize. The hold time was found to vary significantly. Most of the variation depends on the particular grip in use due to the differences in the required volume of air within the air chambers of the different size grips. Another source of variation is related to the amount of time the air is allowed to flow into the grip. This overall settling time was experimentally determined to be >50 ms on the smallest grips and <600 ms on the largest grips. Using a fixed time of 600 ms would unnecessarily slow down the operation of the smaller grips. By monitoring the rate of change in pressure during the hold (e.g., see FIG. 16B), the safety processor 302 can detect stabilization of the air pressure. For example, the rate of change (or slope) will approach zero as the pressure nears stabilization. The hold will end when the rate of change drops below a predetermined threshold.

The example safety processor 302 may adjust the delay for each wait period (e.g., the settling time after the air pressure burst) based on how long the air pressure takes to stabilize. For example, the safety processor 302 may implement proportional and/or integral control with gains based on a difference between the current pressure and the target pressure, and/or based on an overall time that the system has been different than the desired set point. By adjusting the wait time, the safety processor 302 may avoid having a fixed long delay that would substantially increase the time to reach the desired pressure.

At the conclusion of the wait time, the safety processor 302 may repeat the burst of air pressure if the grip pressure is below the desired pressure. Conversely, if the grip pressure is within a predetermined tolerance the safety processor 302 can control the valves to maintain the air pressure. The example control processor 302 may use the state of the grip pressure to take actions based on the grip pressure and/or other system states as discussed above. For example, when the grips are closed at a lower pressure, the safety processor 302 may permit increasing the grip pressure to a higher pressure and/or allowing a test to start based on the restricted or unrestricted state.

The example control processor 302 may reduce the pressurization of the grips in a similar manner as increasing the pressure, such as by reducing the pressure in bursts. For example, if too much air if let into the system, and/or if the set point pressure is reduced, the control processor 302 may control (e.g., energize, de-energize) the dump valve(s) to exhaust a burst of air pressure from the grips, and then enter a hold state for the pressure to stabilize. If the measured pressure of the system is still above the desired setpoint, the control processor 302 may cause another burst of air to be exhausted from the system until the desired set point pressure is reached.

In some examples, the safety processor 302 dynamically adjusts the gains based on an expected pressure increase in the last fill cycle (e.g., air pressure burst) and the actual pressure increase in the last fill cycle. If the actual pressure increase was less than the expected pressure increase, the safety processor 302 increases the gains. Conversely, if the actual pressure increase was more than the expected pressure increase, the safety processor 302 decreases the gains. As a result, the safety processor 302 may interoperate with different sizes of grips, such as grips having grip pressure from 50 Newton (N) to 10,000 N, without the user providing any information to the grip size. The 50 N grips have a small volume and are effectively filled with small air pressure bursts. On the other hand, the 10,000 N grips have a large volume and would take a very long time to fill with the same duration air pressure bursts used for the 50 N grips. Thus, the safety processor 302 determines (e.g., learns) the size volume is connected to it and adjusts the air pressure filling parameters.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A material testing system, comprising:
   a pneumatic grip configured to grip a specimen under test based on a supplied pressure; and
   a processor configured to control the pressure supplied to the pneumatic grip during a pressurization of the pneumatic grip over a plurality of fill cycles by repeatedly:
   in response to determining that a current pressure is less than a target pressure for the pressurization, performing one of the plurality of fill cycles by controlling a fill valve to increase the supplied pressure;
   allowing the supplied pressure to stabilize by switching the fill valve to a hold state for a wait time after the fill cycle; and
   adjusting the wait time based on comparing an expected pressure increase to an actual pressure increase during a prior one of the fill cycles.

2. The material test system as defined in claim 1, wherein the pneumatic grip comprises a first grip and a second grip, and the processor is configured to control the pressure supplied to the pneumatic grip by controlling the pressure to at least one of the first grip or the second grip.

3. The material test system as defined in claim 2, further comprising a second fill valve, wherein the fill valve is configured to control gas flow from a gas supply to the second fill valve, and the second fill valve is configured to control gas flow from the fill valve to the first grip.

4. The material test system as defined in claim 3, wherein the processor is configured to control the second fill valve to selectively increase pressure, maintain pressure, or relieve pressure via an exhaust.

5. The material test system as defined in claim 3, further comprising a third fill valve configured to control gas flow from the fill valve to the second grip.

6. The material test system as defined in claim 3, wherein the processor is configured to allow the supplied pressure to stabilize after each increase by closing the fill valve and the second fill valve.

7. The material test system as defined in claim 1, further comprising a dump valve configured to exhaust pressure from the pneumatic grip.

8. The material test system as defined in claim 1, wherein the fill valve comprises a first solenoid and the dump valve comprises a second solenoid, and the processor is configured to control the first solenoid and the second solenoid to have default states configured to relieve pressure from the pneumatic grip.

9. The material test system as defined in claim 1, wherein the processor is configured to determine that the supplied pressure has stabilized during the fill cycle based on a rate of change of the pressure.

10. The material test system as defined in claim 9, wherein the processor is configured to determine that the supplied pressure has stabilized during the fill cycle when the rate of change of the pressure is less than a threshold rate.

11. A method to control a pneumatic device on a material testing system, the method comprising:
controlling, with a processor, a pressure supplied to a pneumatic device of a material testing system during a pressurization of the pneumatic grip over a plurality of fill cycles by repeatedly, via the processor:
in response to determining that a current pressure is less than a target pressure for the pressurization, performing one of the plurality of fill cycles by controlling a fill valve to increase the supplied pressure;
allowing the supplied pressure to stabilize by switching the fill valve to a hold state for a wait time after the fill cycle; and
adjusting the wait time based on comparing an expected pressure increase to an actual pressure increase during a prior one of the fill cycles.

12. The method as defined in claim 11, wherein the pneumatic grip comprises a first grip and a second grip, wherein the controlling of the pressure supplied to the pneumatic grip comprises controlling the pressure to at least one of the first grip or the second grip.

13. The method as defined in claim 12, wherein the controlling of the fill valve to increase the supplied pressure comprises:
controlling gas flow from a gas supply to a second fill valve; and
controlling the second fill valve to control gas flow from the fill valve to the first grip.

14. The method as defined in claim 13, further comprising controlling the second fill valve to selectively increase pressure, maintain pressure, or relieve pressure via an exhaust.

15. The method as defined in claim 13, wherein the controlling of the fill valve to increase the supplied pressure comprises controlling gas flow from the fill valve to the second grip by controlling a third fill valve.

16. The method as defined in claim 13, wherein the allowing of the supplied pressure to stabilize comprises closing the fill valve and the second fill valve.

17. The method as defined in claim 11, further comprising controlling a dump valve to exhaust pressure from the pneumatic grip.

18. The method as defined in claim 11, wherein the fill valve comprises a first solenoid and the dump valve comprises a second solenoid, the method further comprising controlling the first solenoid and the second solenoid to have default states configured to relieve pressure from the pneumatic grip.

19. The method as defined in claim 11, further comprising determining that the supplied pressure has stabilized during the fill cycle based on a rate of change of the pressure.

20. The method as defined in claim 19, wherein the determining that the supplied pressure has stabilized during the fill cycle is in response to determining that the rate of change of the pressure is less than a threshold rate.

21. The material testing system as defined in claim 1, wherein the processor is further configured to, for at least one of the plurality of fill cycles, control an air pressure filling parameter of the at least one of the fill cycles based on comparing the expected pressure increase to the actual pressure increase during the prior one of the fill cycles.

* * * * *